(12) United States Patent
Akkermans et al.

(10) Patent No.: US 12,404,113 B2
(45) Date of Patent: Sep. 2, 2025

(54) CONVEYOR BELT OPERATION MONITORING SYSTEM

(71) Applicant: Ashworth Bros., Inc., Fall River, MA (US)

(72) Inventors: Nathaniël Akkermans, Breda (NL); Pieter Remco de Vries, Zaandijk (NL)

(73) Assignee: Ashworth Bros., Inc., Fall River, MA (US)

( * ) Notice: Subject to any disclaimer, the term of this patent is extended or adjusted under 35 U.S.C. 154(b) by 0 days.

(21) Appl. No.: 18/364,693

(22) Filed: Aug. 3, 2023

(65) Prior Publication Data
US 2025/0042669 A1    Feb. 6, 2025

(51) Int. Cl.
*B65G 43/02*   (2006.01)
*B65G 23/44*   (2006.01)

(52) U.S. Cl.
CPC ............ *B65G 43/02* (2013.01); *B65G 23/44* (2013.01); *B65G 2203/0275* (2013.01); *B65G 2203/0283* (2013.01); *B65G 2203/0291* (2013.01); *B65G 2203/042* (2013.01); *B65G 2207/24* (2013.01)

(58) Field of Classification Search
CPC ..... B65G 23/44; B65G 43/02; B65G 2207/24
USPC ....................... 198/810.02, 810.04
See application file for complete search history.

(56) References Cited

U.S. PATENT DOCUMENTS

| | | |
|---|---|---|
| 4,566,339 A | 1/1986 | Davidson et al. |
| 4,587,852 A | 5/1986 | Bulter et al. |
| 5,207,108 A | 5/1993 | Tassic |
| 7,252,307 B2 | 8/2007 | Kanbe et al. |
| 7,635,060 B2 | 12/2009 | Lagneaux |
| 8,387,777 B2 | 3/2013 | Tokhtuev et al. |
| 8,397,904 B2 | 3/2013 | Bogle |
| 8,727,102 B2 | 5/2014 | Tokhtuev et al. |
| 8,931,628 B2 * | 1/2015 | Hill ........ B65G 43/02 198/810.04 |
| 8,950,277 B2 | 2/2015 | Bodeker et al. |
| 9,004,271 B2 | 4/2015 | Fourney |
| 9,242,801 B2 | 1/2016 | DeGroot et al. |
| 9,527,673 B2 | 12/2016 | Bogle et al. |
| 9,551,624 B2 | 1/2017 | Herhaus |
| 9,884,723 B2 | 2/2018 | Neely et al. |
| 10,513,397 B2 | 12/2019 | Bogle |
| 11,230,460 B2 | 1/2022 | Turek et al. |
| 11,536,647 B2 | 12/2022 | Oostdijk et al. |

(Continued)

FOREIGN PATENT DOCUMENTS

DE  102008053715 A1 *  5/2010 ............ B65G 43/00
EP  1362003 B1  4/2006

(Continued)

OTHER PUBLICATIONS

Extended European Search Report and Office Action dated Feb. 10, 2025 in European Application No. 24191699.8.

(Continued)

*Primary Examiner* — James R Bidwell
(74) *Attorney, Agent, or Firm* — Plumsea Law Group, LLC

(57) ABSTRACT

A sensor assembly for a conveyor belt includes a load cell attachable to a link of a modular conveyor belt and configured to measure tension in the belt and a housing. The housing may include a first cavity configured to receive at least a portion of the load cell, and a second cavity configured to receive one or more electronic components.

24 Claims, 19 Drawing Sheets

(56) References Cited

U.S. PATENT DOCUMENTS

| | | |
|---|---|---|
| 2009/0036272 A1 | 2/2009 | Yoo |
| 2009/0194391 A1* | 8/2009 | Lagneaux ............... G01L 5/101 |
| | | 198/810.04 |
| 2010/0065405 A1 | 3/2010 | Lagneaux |
| 2017/0030815 A1* | 2/2017 | Frost ..................... B65G 43/02 |
| 2018/0356276 A1 | 12/2018 | Bowie |
| 2020/0150027 A1 | 5/2020 | Oostdijk et al. |
| 2020/0346874 A1 | 11/2020 | Onishi et al. |
| 2022/0161832 A1 | 5/2022 | Ueda et al. |
| 2022/0221028 A1 | 7/2022 | Wheeler et al. |
| 2022/0258983 A1 | 8/2022 | Norpoth |

FOREIGN PATENT DOCUMENTS

| | | | |
|---|---|---|---|
| EP | 2471727 B1 | 9/2013 | |
| EP | 3539906 A1 * | 9/2019 | ............ B65G 17/40 |
| EP | 2488428 B1 | 11/2021 | |
| EP | 2635512 B1 | 6/2022 | |
| WO | 2012071198 A2 | 5/2012 | |
| WO | 2013066627 A1 | 5/2013 | |
| WO | 2019045043 A1 | 3/2019 | |
| WO | 2021151577 A1 | 8/2021 | |
| WO | 2022126235 A1 | 6/2022 | |
| WO | 2023281354 A1 | 1/2023 | |

OTHER PUBLICATIONS

Extended European Search Report and Office Action dated Feb. 10, 2025 in European Application No. 24191714.5.
Office Action dated Apr. 29, 2025 in U.S. Appl. No. 18/364,624.

\* cited by examiner

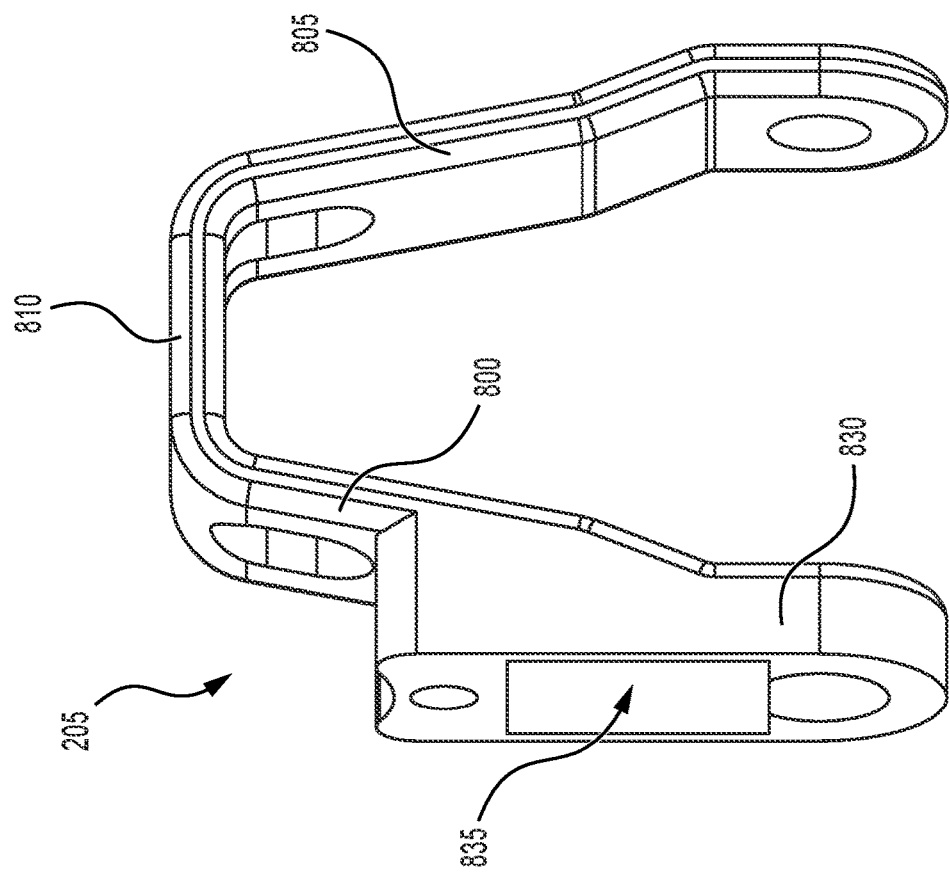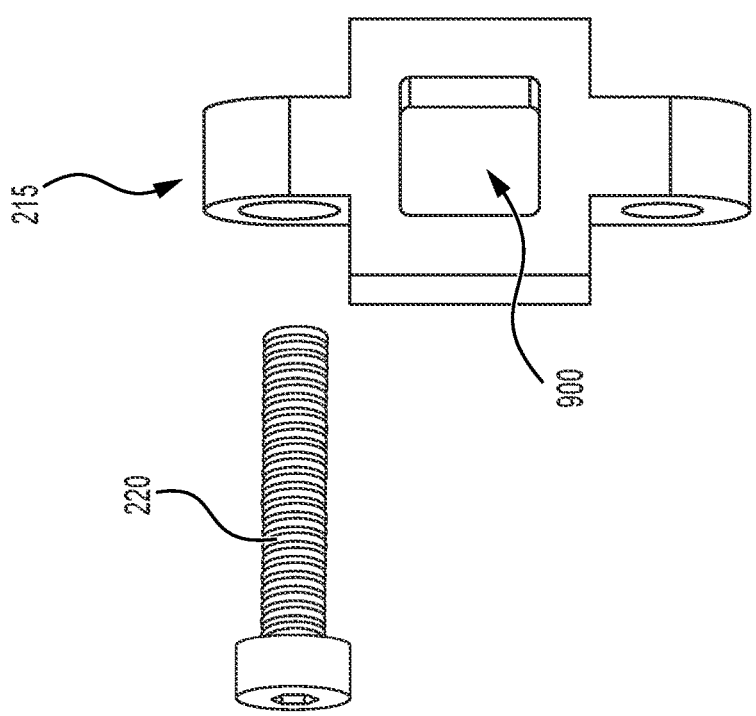
FIG. 9

CONVEYOR BELT OPERATION MONITORING SYSTEM

BACKGROUND

The present disclosure is directed to a conveyor belt operation monitoring system and, more particularly, to a conveyor system with one or more belt-integrated onboard sensors and at least one offboard data-receiving module.

Conveyor belts are often operated in harsh conditions, including high and/or low temperatures, humidity, dust, and/or debris. In addition, the complexity of the belt path can also add to the difficulty in operation. Also, failures in belt operation can be costly, time consuming, and generally inconvenient.

The present disclosure is directed to systems and methods for addressing one or more of the issues described above.

SUMMARY

The disclosed system is configured for collecting data regarding belt operating conditions in order to observe trends and prevent more significant belt operating malfunctions. To that end, the system includes one or more belt-integrated onboard sensors and at least one offboard data receiving module. For example, the disclosed system includes at least one onboard sensor assembly including a variety of sensors, including a tension sensor (load cell), a gyroscopic sensor configured to detect belt angle in three axes, and an acceleration sensor configured to detect belt acceleration along the same three axes. The disclosed system is configured to collect data with these onboard sensors and then transmit the data to an offboard controller for processing. Anomalies can be detected, and alerts/alarms activated so that steps can be taken to alleviate the issues causing the anomalies.

In one aspect, the present disclosure is directed to a sensor assembly for a conveyor belt, comprising: a load cell attachable to a link of a modular conveyor belt and configured to measure tension in the belt and a housing. The housing may include a first cavity configured to receive at least a portion of the load cell, and a second cavity configured to receive one or more electronic components.

In another aspect, the present disclosure is directed to a tension sensing system for a conveyor belt, comprising: a first link pivotally connectable to other links of the conveyor belt and a sensor assembly attached to the first link. The sensor assembly may include a load cell attachable to the first link and configured to measure tension in the belt, and a housing having a first cavity configured to receive at least a portion of the load cell.

In another aspect, the present disclosure is directed to a conveyor belt, comprising: a plurality of links connected by a plurality of connecting rods, the plurality of links including at least a first link; a sensor assembly attached to the first link, the sensor assembly including: a load cell attachable to the first link and configured to measure tension in the belt; and a housing having a first cavity configured to receive at least a portion of the load cell.

In another aspect, the present disclosure is directed to a sensor assembly for a conveyor belt, comprising: one or more sensors configured to be integrated with the belt and collect data regarding belt operating conditions; and an onboard controller including a device processor and a non-transient computer readable medium. The computer readable medium having stored thereon instructions, executable by the processor, to perform the following functions: receiving data from the one or more sensors; and transmitting the data to an offboard controller.

In another aspect, the present disclosure is directed to a receiver module for a conveyor belt data collection system, comprising: a housing located offboard from the belt and configured to be positioned proximate to a conveyor belt; a belt interface unit including an offboard controller including a device processor and a non-transient computer readable medium. The computer readable medium having stored thereon instructions, executable by the processor, to perform the following functions: receiving data regarding belt operating conditions transmitted by an onboard controller integrated with the belt.

In another aspect, the present disclosure is directed to a conveyor belt operation monitoring system, comprising: one or more sensors configured to be integrated with the belt and collect data regarding belt operating conditions; and an onboard controller including a first device processor and a first non-transient computer readable medium. The computer readable medium having stored thereon instructions, executable by the processor, to perform the following functions: receiving data from the one or more sensors; and transmitting the data to an offboard controller; and at least one receiving module including a belt interface unit, the belt interface unit including an offboard controller including a second device processor and a second non-transient computer readable medium having stored thereon instructions, executable by the processor, to perform the following functions: receiving the data transmitted by the onboard controller.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 9 is another schematic exploded view of the link and load cell assembly;

DETAILED DESCRIPTION

For clarity, the detailed descriptions herein describe certain exemplary embodiments. A positive drive spiral conveyor system is shown. However, the disclosure in this application may be applied to any suitable conveyor system. That is, systems other than positive drive and non-spiral systems may implement the disclosed sensor array/system.

The spiral conveyor system discussed below is generally a positive drive system, where a drive element comes into direct contact with the conveyor belt to propel the conveyor belt in a travel direction. In the systems discussed below, a central rotating drum includes drive elements that include a drive face for engaging with the conveyor belt. The drive face on the drive element may be adjacent a contoured surface of the drive element, such as a rib that protrudes from the drum or a surface of the drive element. The rib may provide improved geometry for the drive face and also may smooth the travel of the conveyor belt up or down the spiral, particularly when the rib itself has varying height above the drum surface. The conveyor belt may also include a provision to enhance the engagement with the rib, such as a protrusion or a tab with a flat surface for better contact with the drive face.

Figure 1:
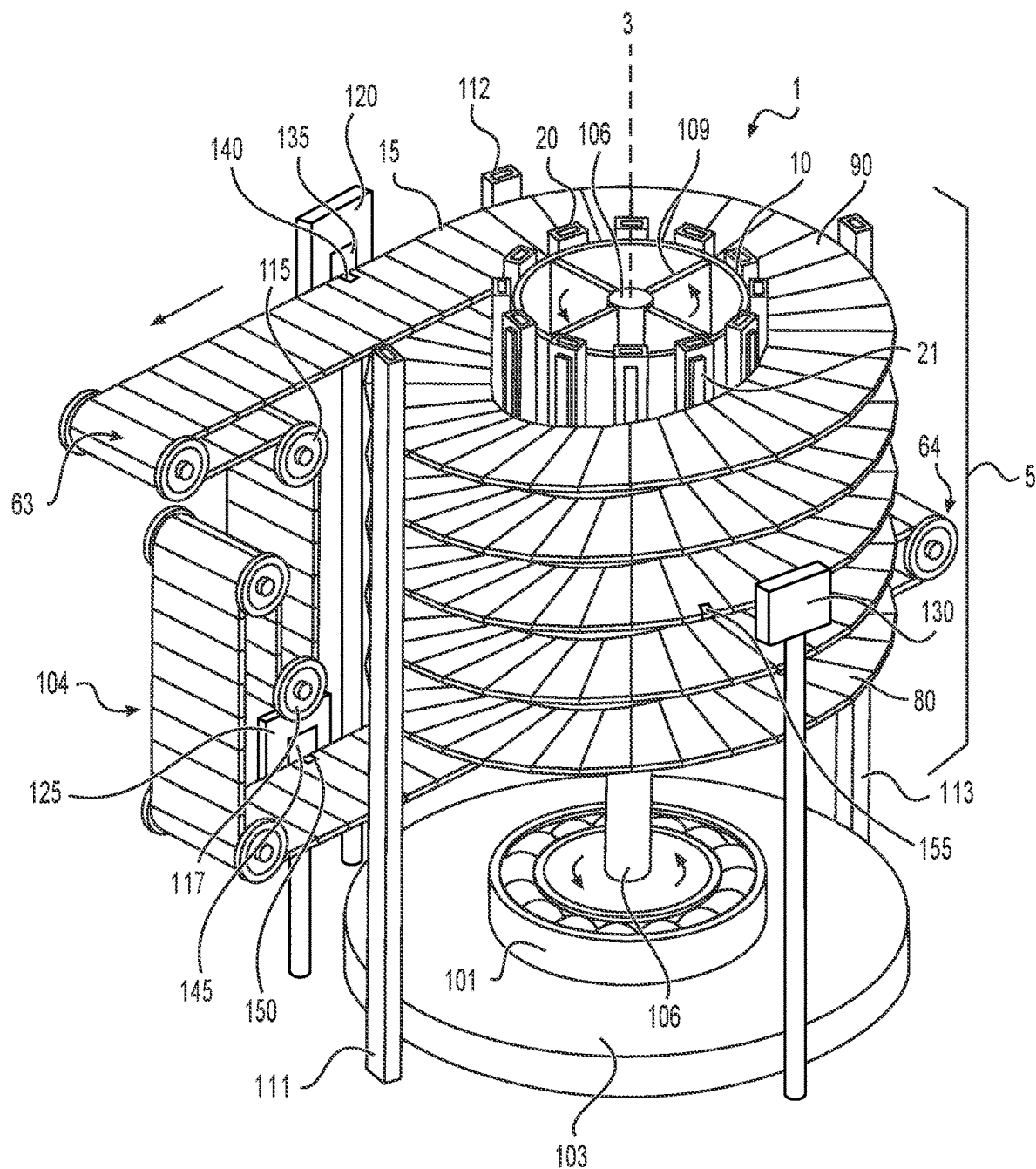
FIG. 1 is a schematic illustration of a spiral conveyor system according to an exemplary embodiment.

FIG. 1 shows an embodiment of a spiral conveyor system 1 that may utilize at least one contoured drive element drive system. Spiral conveyor systems such as spiral conveyor system 1 are well known in the art. Spiral conveyor system 1 may include a conveyor belt 15 that is configured to travel a spiral column 5 around a driving drum 10. In some embodiments, driving drum 10 may include one or more drive elements 20 that engage with conveyor belt 15 for a positive drive system, where the frictional and/or geometric engagement of the drive elements 20 with conveyor belt 15 impart forward motion to conveyor belt 15. In some embodiments, driving drum 10 and the edge of conveyor belt 15 may include provisions that engage with each other to transfer driving force from the turning drum to the conveyor belt.

Drum 10 may be configured to rotate at various RPM (revolutions per minute), but may be configured to turn at low RPM. The precise speed may depend upon factors such as the height of spiral column 5, the length of belt 15, and the intended use of the system, such as to establish a particular cooking, baking, or freezing time. In some embodiments, drum 10 may turn at 15 RPM or less. In some embodiments, drum 10 may turn at 10 RPM or less. In some embodiments, drum 10 may turn at 4 RPM or less. In some embodiments, drum 10 may turn at a rate between 0.1 RPM and 10 RPM, inclusive.

Drum 10 may be rotated using any method known in the art, such as with a motor (not shown) positioned proximate a base 103 of spiral conveyor system 1. The motor may transfer the power it generates to drum 10 using any mechanism known in the art. In some embodiments, such as the embodiment shown in FIG. 1, known systems, such as chains and gear boxes to control the transfer of power from the motor to shaft 106, may be provided. Shaft 106 may be any type of drive shaft known in art, such as an elongated metal pole that extends from base 103 to the top of spiral column 5 along drum central axis 3. One or more struts such as strut 109 may attach shaft 106 to drum 10 to transfer the rotational force of shaft 106 to drum 10. Drum 10 may be generally cylindrical in shape and may, in some embodiments, include a cylindrical surface. The cylindrical surface may be a continuous cylindrical drum surface formed of sheet metal, or may have a discontinuous surface formed of individual vertical drive elements extending between and connecting circular support bands arranged about the center axis of the drum, or may be a combination of sheet metal and vertical bars as shown in FIG. 1. Other construction is contemplated to provide a suitable cylindrical surface for guiding an inside edge of belt 15 through spiral column 5. Drive elements 20 may comprise a rib attached to the sheet metal surface of the drum, such as in the embodiments shown in FIG. 1, or to a cage bar, for example where the rib extends from a surface of a cage bar cap. Drive elements 20 may also comprise a cap or covering, such as to provide the contoured surface and/or for improved wear properties.

A bottom bearing 101 may be provided in, on, or associated with a motor, gearbox, and/or a conveyor frame. As is known in the art, a bottom bearing 101 is provided to reduce rotational friction between the motor and/or base 103 and shaft 106 while supporting radial and axial loads. Bearings and their functionality are generally well known and understood in the art.

Conveyor belt 15 may be modular and include links and connecting rods. An exemplary modular belt implementing links and connecting rods is shown and discussed in Neely et al., U.S. Pat. No. 9,884,723, issued Feb. 6, 2018, and entitled Spiral Conveyor System, the entirety of which is incorporated herein by reference.

Conveyor belt 15 may be any type of endless belt known in the art. Conveyor belt 15 may be made from metal, plastic, composites, ceramics, combinations of these materials, or any other type of conveyor belt material known in the art. The particular material may be selected based on factors such as temperature exposure (baking, freezing, room temperature conveying), required tension, length of the belt, ability to clean and/or disinfect the belt, etc. In some embodiments, such as the embodiment shown in FIG. 1, belt 15 may be an upgoing belt, where belt 15 travels from a bottom 64 of spiral column 5 to a top 63 of spiral column 5. In other embodiments, the direction of travel may be downgoing, where belt 15 travels from top 63 to bottom 64. Belt paths at top 63 and bottom 64 may be aligned as shown or arranged at an angle with respect to each other about a central axis 3 of drum 10.

In use, a conveyor belt 15 enters at one end of drum 10, typically bottom 64. Conveyor belt 15 may be fed into the system 1 off of two rollers or sprockets positioned on an axle. Conveyor belt 15 travels through stacked helical tiers around the center drum 10. Conveyor belt 15 then exits at the opposite end of drum 10, typically near top 63. Conveyor belt 15 may be an endless belt 15, in which case conveyor belt 15 is fed back to the axle/sprocket at the other end of drum 10 (e.g., in one embodiment, belt 15 travels back to bottom 64 of drum 10 after exiting at top 63 of drum 10.) In any embodiment, however, the system may be upgoing (traveling from bottom to top) or downgoing (traveling from top to bottom). The gearing and optional weighting of belt 15 at the entrance and/or exit points of spiral 5 may be configured to assist in controlling tension in belt 15 as belt 15 moves through the system 1. For example, system 1 may include a take-up sprocket 115 configured to pull belt 15 out of spiral column 5. Take-up sprocket 115 may be located at or after the first terminal roller. Take-up sprocket 115 may be independently driven, such as with a motor. In some embodiments, the motor may be a constant torque motor so that the tension in belt 15 may be controlled within a desired range. In some embodiments, a weighted take-up roller 117 may be provided to assist in maintaining the belt tension along return path 104 and to remove slack belt from the system. Proper tension in belt 15 may inhibit operational issues such as slippage of belt 15 with respect to drum 10, belt flip-up, or difficulty feeding belt 15 into or out of the helical stack.

In some embodiments, the first tier 80 of belt 15 at the entrance end (e.g., bottom 64) has a first larger radius and the last tier of belt 15 at the exit end has a second smaller radius. For example, FIG. 1 shows two different tiers, first tier 80 and second tier 90, of belt 15 made of links and elongated rods that connect the links together. Drum 10 may have a first radius supporting first tier 80 and a second smaller radius supporting second tier 90. The first radius may be at a lower position on drum 10 than the second radius. Belt 15 may be held at either radius by engagement of the circumferential support surfaces of belt 15 with circumferential support surfaces of the drive elements 20.

The spiral may include general support posts, such as a first post 111, a second post 112, and a third post 113, as shown in FIG. 1. The spiral may have any suitable number of posts, which may be positioned as needed for a structurally sound construction.

In addition, components of a belt data collection system may be incorporated into the belt path. For example, as discussed in greater detail below, one or more sensor arrays may be integrated with the belt in order to facilitate collection of data, such as tension data, angle data, acceleration data, etc. As shown, belt 15 may include at least one sensor assembly. As shown in FIG. 1, the system may include a first sensor assembly 140, a second sensor assembly 150, and a third sensor assembly 155. It will be understood that the belt may include any desired number of sensor assemblies, including a single sensor assembly or multiple sensor assemblies.

In addition, one or more receiver modules may be located along the path of the belt system. For example, FIG. 1 shows three receiver modules, including a first receiver module 120, a second receiver module 125, and a third receiver module 130. It will be understood that the system may have any suitable number of receiver modules, including a single receiver module or multiple receiver modules. The number of receiver modules may be chosen based on various factors, such as the overall size of the belt system, the complexity of the belt system, the amount of data collected, etc. In some embodiments, a plurality of receiving modules may form a mesh network. The more sensor assemblies and receiving modules in a system, the more data can be collected, more frequently, with further reach of communications.

Each receiver module may include a belt interface unit. For example, first receiver module 120 may include a first belt interface unit 135. In addition, second receiver module 125 may include a second belt interface unit 145. Third receiver module 130 is facing the other way, and thus, the third belt interface unit is not shown in FIG. 1. It will be understood that the configuration and arrangement of the receiver modules and belt interface units as depicted in FIG. 1 is schematic only. Those having ordinary skill in the art will recognize suitable configurations and arrangements for these components.

When a sensor assembly passes by first belt interface unit 135, the system may perform various functions. For example, the belt interface unit may charge a power source in the sensor assembly via inductive charging. Alternatively, or additionally, the belt interface unit may receive data transmitted by the sensor assembly. It will be understood that one all belt interface units may perform the same function in a given system. For example, in some cases, all of the belt interface units may perform the inductive charging function, but only a single belt interface unit may collect data. It will be understood that as many or as few belt interface units may perform the charging and/or data collection functions as desired.

Figure 2:
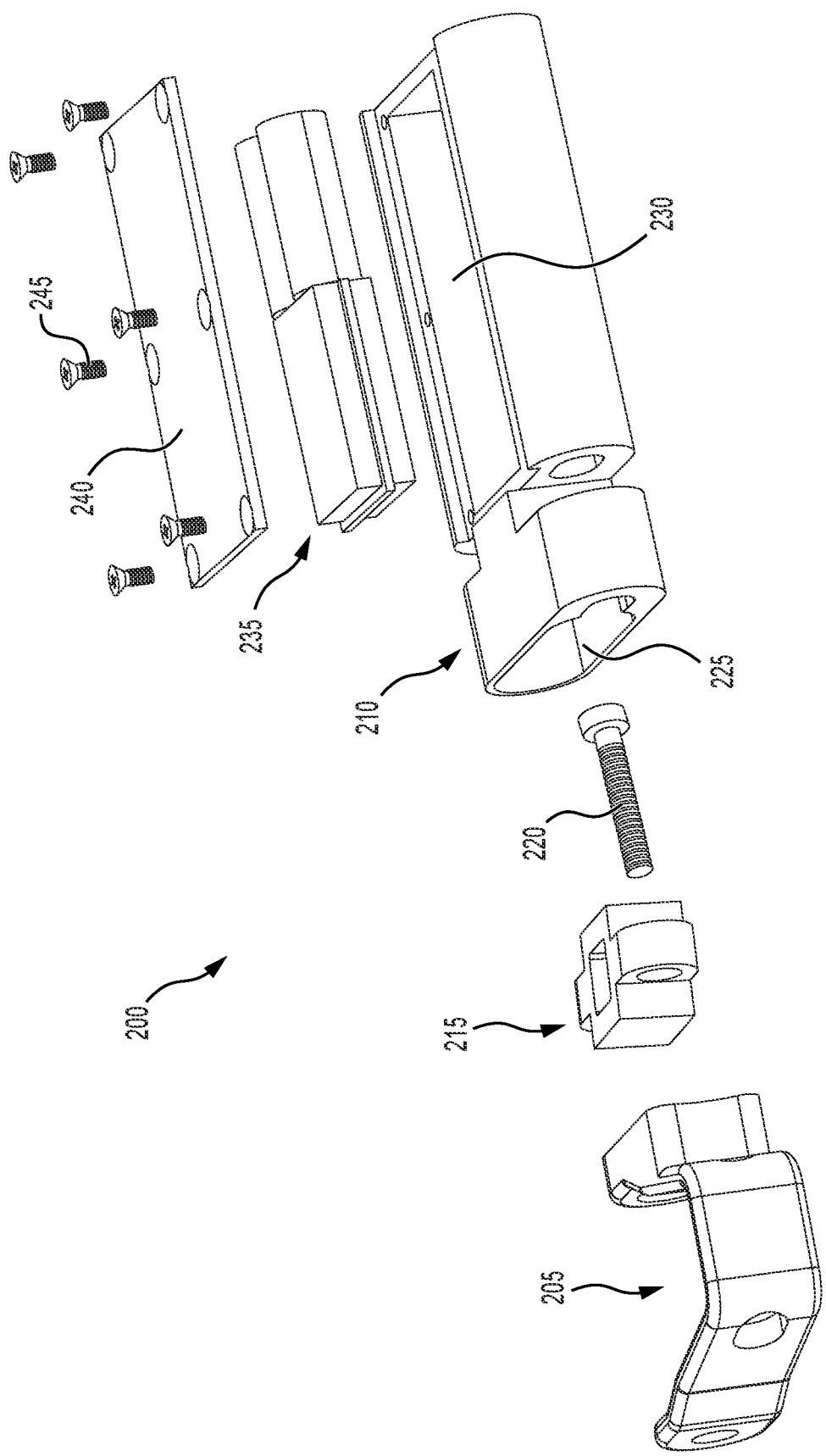
FIG. 2 is a schematic exploded view of an onboard sensor assembly for a conveyor belt.

FIG. 2 is a schematic exploded view of an onboard sensor assembly for a conveyor belt. As shown in FIG. 2, a sensor assembly 200 may include a link 205, a housing 210, and a load cell 215 attachable to link 205 (e.g., with a fastener 220) and configured to measure tension in the belt. Housing 210 includes a first cavity 225 configured to receive at least a portion of load cell 215, and a second cavity 230 configured to receive one or more electronic components (shown in FIG. 2 as an electronics pod 235). Sensor assembly 200 also includes an electronics cavity cover 240, which is removably attachable via a plurality of fasteners 245 (e.g., screws).

Figure 3:
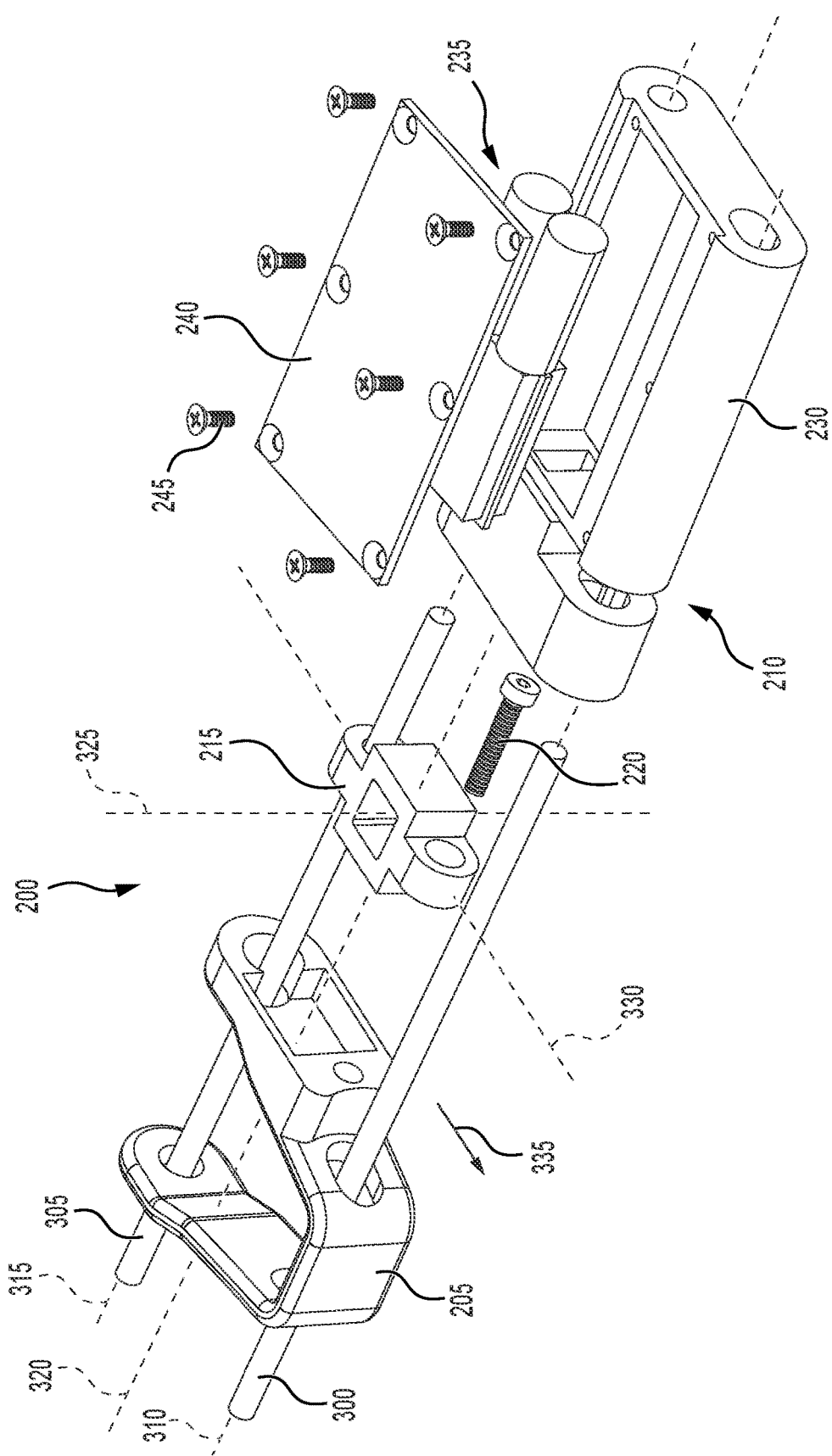
FIG. 3 is a second schematic perspective view of the onboard sensor assembly shown in FIG. 2.

FIG. 3 is a second schematic perspective view of the onboard sensor assembly shown in FIG. 2. As shown in FIG. 3, sensor assembly 200 may be pivotally attached to other links of the belt via connecting rods. For example, a leading connecting rod 300 is shown, as well as a trailing connecting rod 305. Leading connecting rod 300 extends along a leading rod axis 310, and trailing connecting rod extends along a trailing rod axis 315. Leading rod axis 310 and trailing rod axis 315 extend substantially parallel to a horizontal axis 320 of sensor assembly 200. Although it will be understood that the angle of axis 310 may vary with respect to the sensor assembly because the openings at the leading end of the sensor assembly components are ovalized/slotted in order to permit the belt to turn.

As also shown in FIG. 3, a vertical axis 325 extends perpendicular to horizontal axis 320, and a longitudinal axis 330 extends in a fore-aft direction, parallel to the direction of belt travel (indicated by an arrow 335) and perpendicular to both horizontal axis 320 and vertical axis 325.

Accordingly, a conveyor belt according to the disclosed invention may include a plurality of links connected by a plurality of connecting rods, the plurality of links including at least a first link, and a sensor assembly attached to the first link.

As shown in FIG. 3, a first end of the load cell is attached to the lateral extension of link 205 with fastener 220 and a second end of the load cell includes an opening through which one of the connecting rods extends such that the load cell is configured to detect elongation of the second leg of the link due to tension in the conveyor belt.

Figure 4:
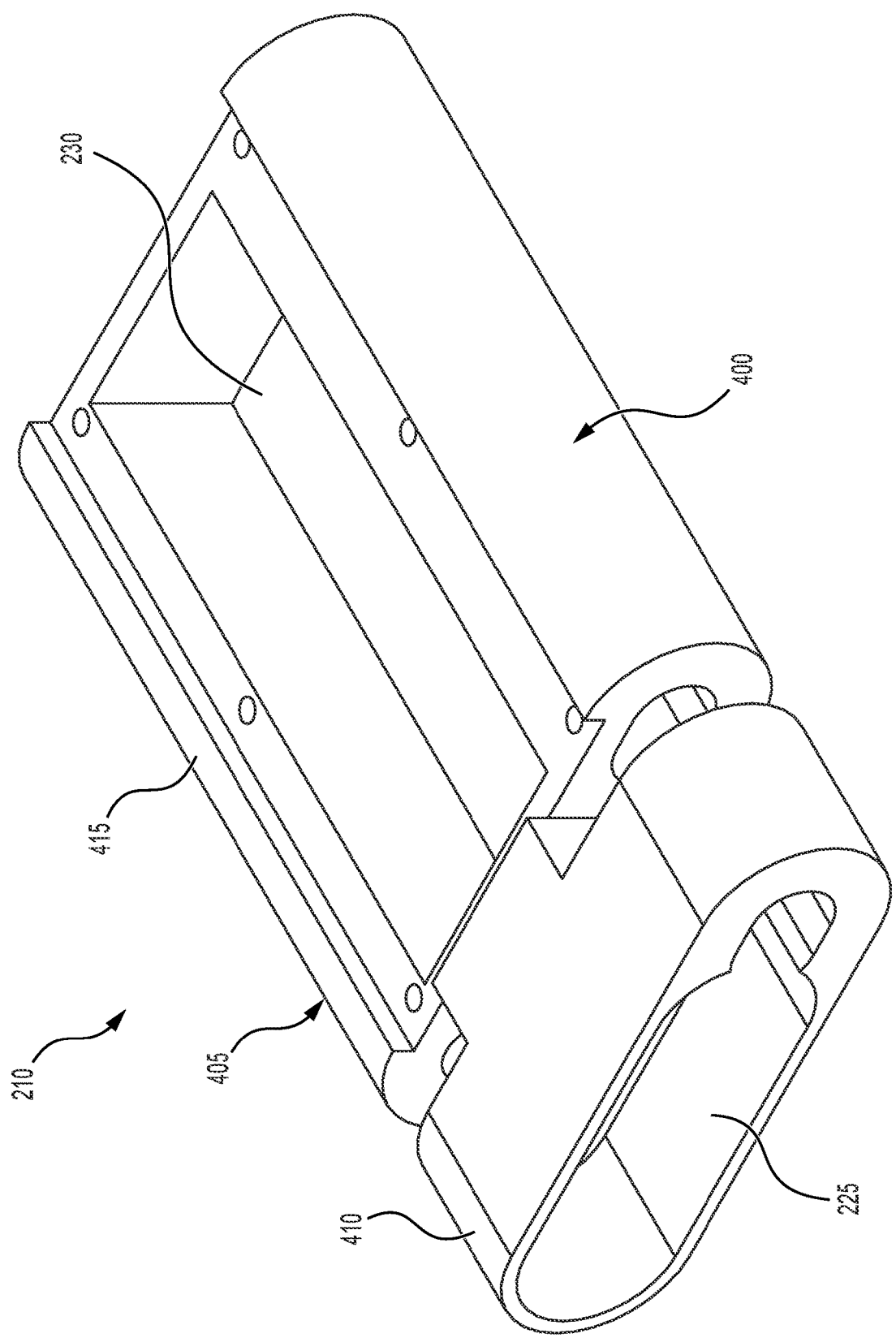
FIG. 4 is a schematic perspective view of an electronics housing from the sensor assembly shown in FIG. 2.

FIG. 4 is a schematic perspective view of the electronics housing from the sensor assembly shown in FIG. 2. As shown in FIG. 4, housing 210 includes a leading side 400 and a trailing side 405. In addition, housing 210 includes a first portion 410 configured to receive the load cell, and a second portion 415 configured to receive the electronics pod.

Figure 5:
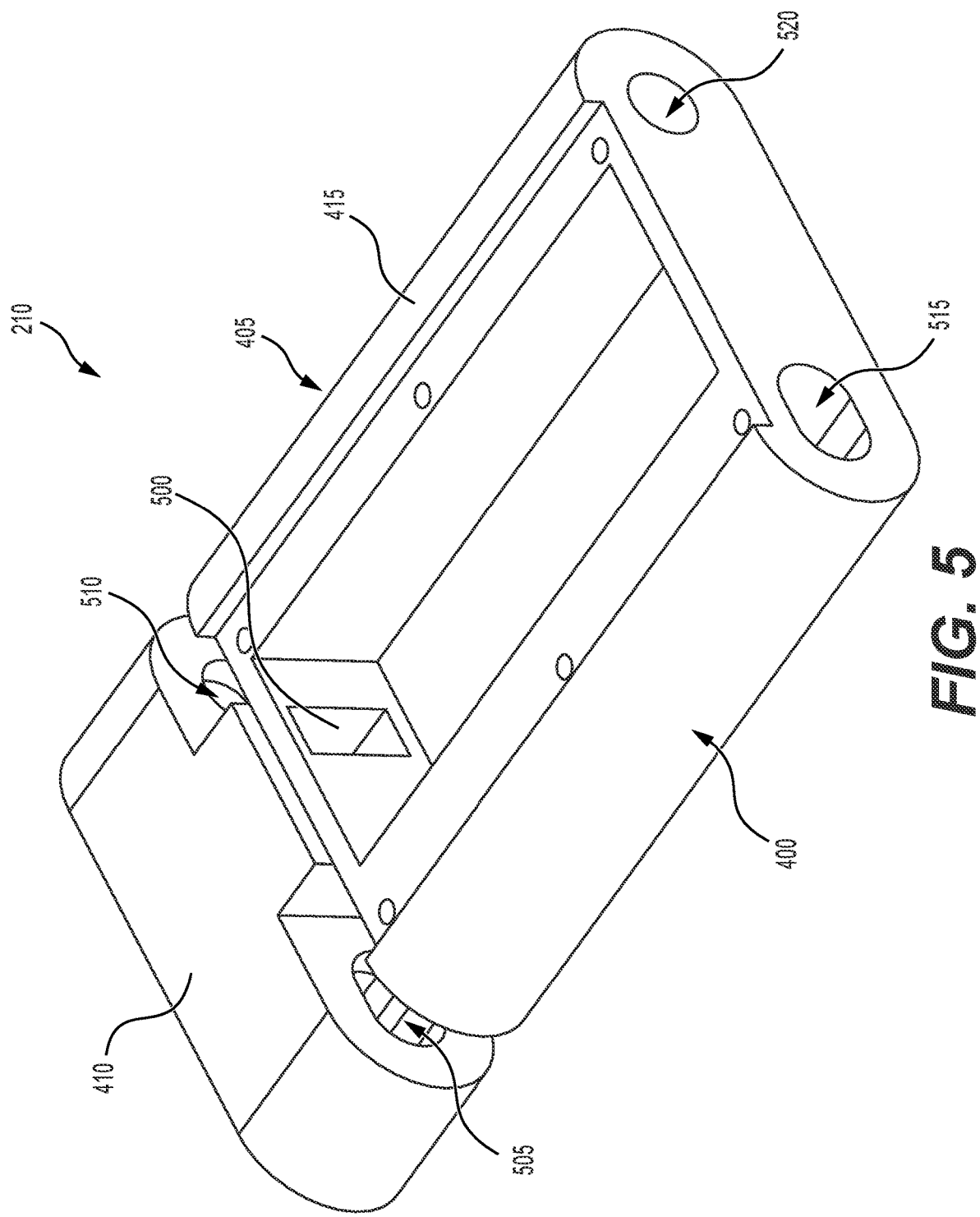
FIG. 5 is a second schematic perspective view of the electronics housing shown in FIG. 4.

FIG. 5 is a second schematic perspective view of the electronics housing shown in FIG. 4. As shown in FIG. 5, housing 210 includes a thru-hole 500 configured to accommodate wiring between the load cell and the electronics pod. In addition, first portion 410 of housing 210 includes a first leading rod opening 505 and a first trailing rod opening 510. Further, second portion 415 of housing 210 includes a second leading rod opening 515 and a second trailing rod opening 520. These four openings are configured to receive connecting rods (see FIG. 3). As shown in FIG. 5, first leading rod opening 505 and second leading rod opening 515 may be ovalized/slotted in order to permit the belt to be a turn-curve belt.

Figure 6:
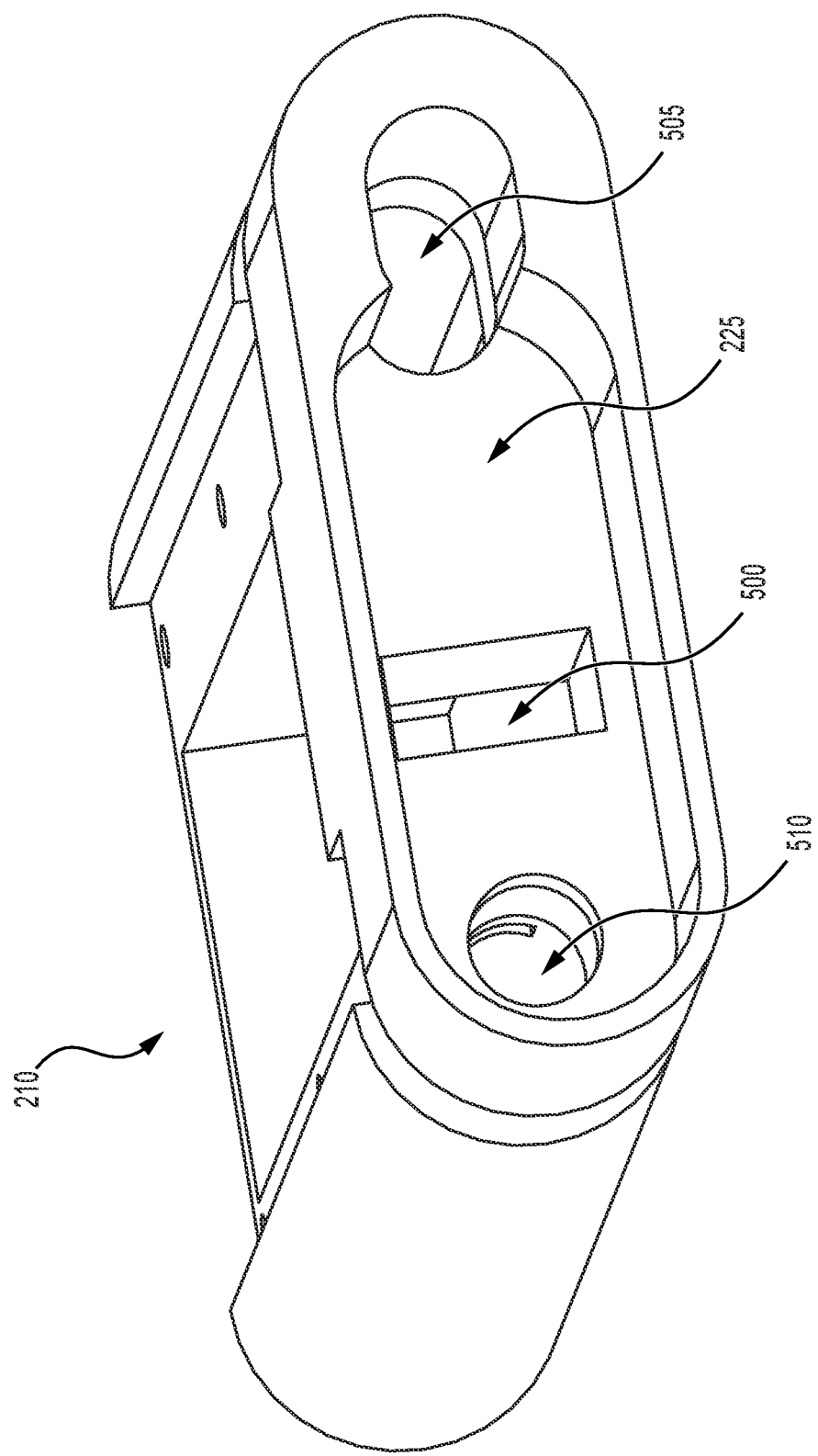
FIG. 6 is a third schematic perspective view of the electronics housing shown in FIG. 4.

FIG. 6 is a third schematic perspective view of the electronics housing shown in FIG. 4. FIG. 6 better illustrates cavity 225, thru-hole 500, first leading rod opening 505, and first trailing rod opening 510.

Figure 7:
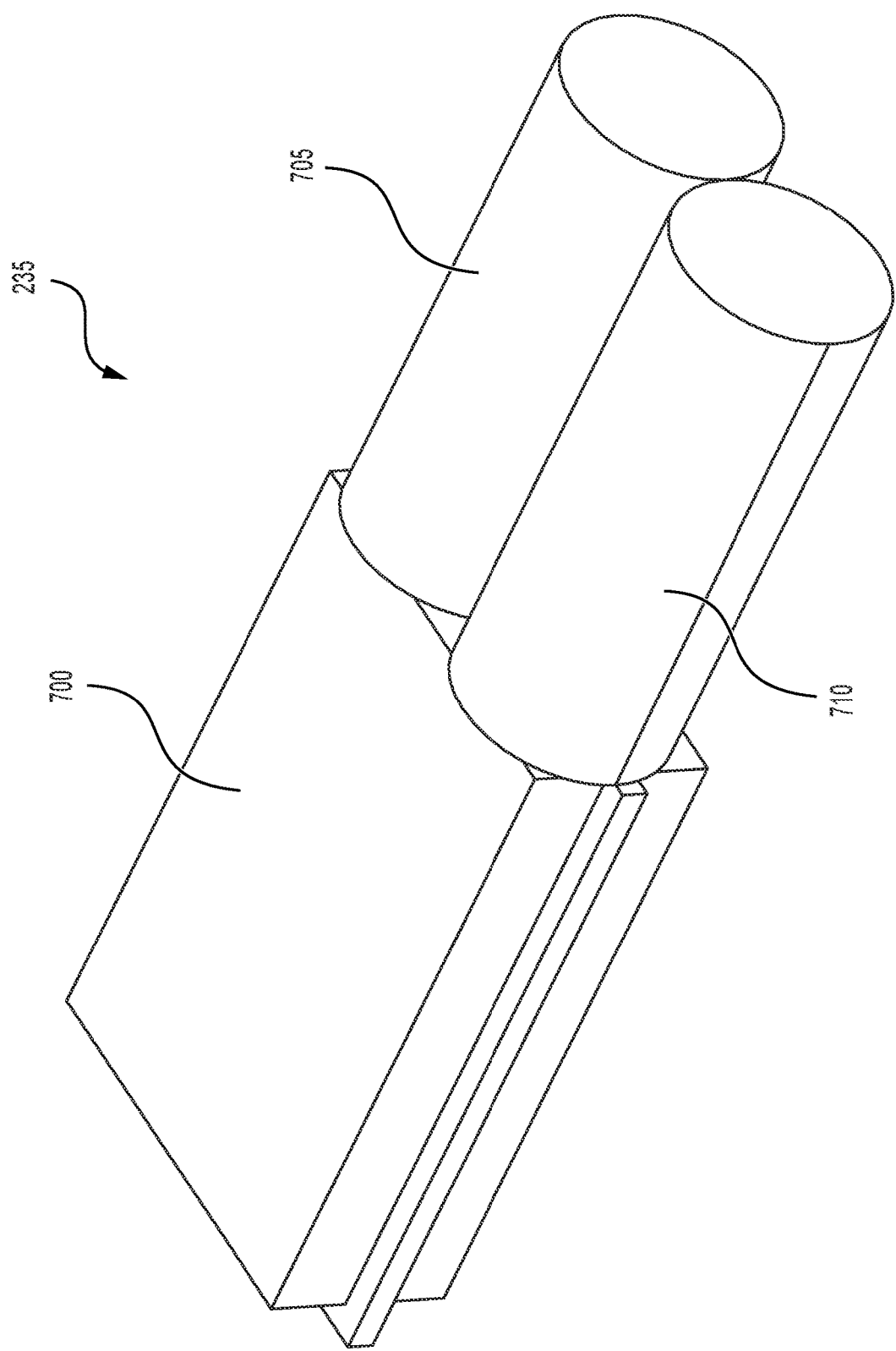
FIG. 7 is a schematic perspective view of an electronics pod from the onboard sensor assembly shown in FIG. 2.

FIG. 7 is a schematic perspective view of the electronics pod from the onboard sensor assembly shown in FIG. 2. As shown in FIG. 7, electronics pod 235 may include a sensor pack 700 containing one or more sensors, such as electronics associated with the load cell, a gyroscopic (angle) sensor, and/or an accelerometer. In addition, electronics pod 235 includes at least one power source, such as a battery or capacitor. As shown in FIG. 7, pod 235 includes a first capacitor 705 and a second capacitor 710.

Capacitors are beneficial to use over batteries for several reasons. First, capacitors charge faster than batteries. Since the sensor assembly passes quickly past the receiving modules, there is limited time for the inductive charging to occur. Therefore, the capacitors maximize the amount of charging that can be accomplished in that short period of time. Second, capacitors drain less than batteries do in cold temperatures. Since the disclosed conveyors may be utilized in cold temperatures, the extra performance of the capacitors in cold temperatures is beneficial. The same is true for higher temperatures, in which capacitors are more stable than batteries. Again, since the disclosed belt systems can be used in high temperature environments, capacitors have an advantage over batteries.

Figure 8:
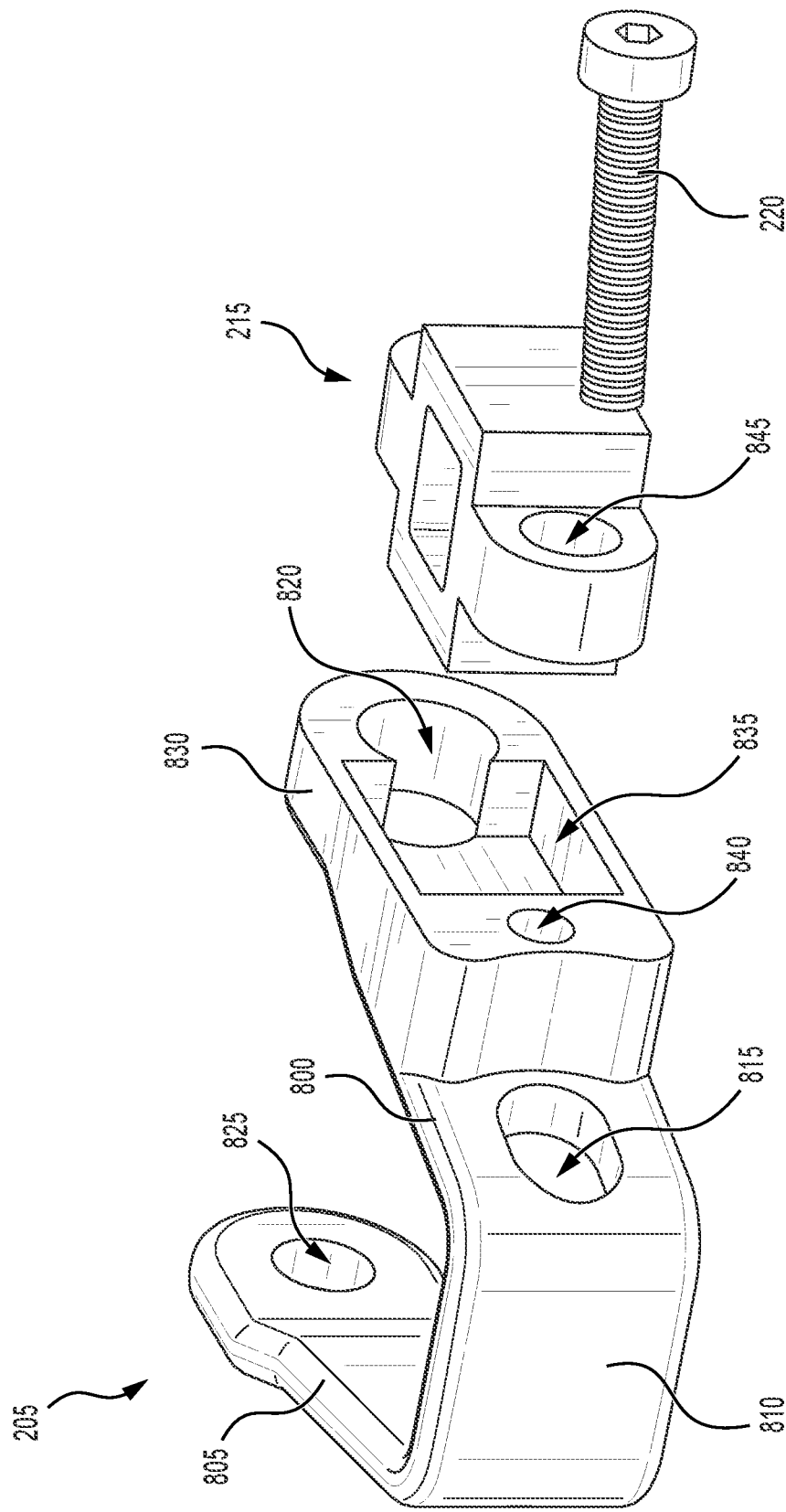
FIG. 8 is a schematic exploded view of a link and load cell assembly from the onboard sensor assembly shown in FIG. 2.

FIG. 8 is a schematic exploded view of the link and load cell assembly from the onboard sensor assembly shown in FIG. 2. As shown in FIG. 8, link 205 may be substantially U-shaped, including a first leg 800, a second leg 805, and a connecting portion 810 extending between first leg 800 and second leg 805. Link 205 also includes a first leading rod opening 815 and a first trailing rod opening 820 in first leg 800. Also, link 205 includes a second leading rod opening (not shown) opposite first leading rod opening 815 (see second leading rod opening 1005 in FIG. 10), and a second trailing rod opening 825.

As also shown in FIG. 8, link 205 includes a lateral extension 830 with a cavity or receptacle 835 configured to receive at least a portion of load cell 215. In addition, lateral extension 830 includes a threaded opening 840 configured to receive fastener 220 (through a fastener opening 845 in load cell 215) to secure load cell 215 to link 205.

FIG. 9 is another schematic exploded view of the link and load cell assembly. As shown in FIG. 9, link 205 is substantially U-shaped. As also shown in FIG. 9, load cell 215 includes a thru-hole 900.

Figure 10:
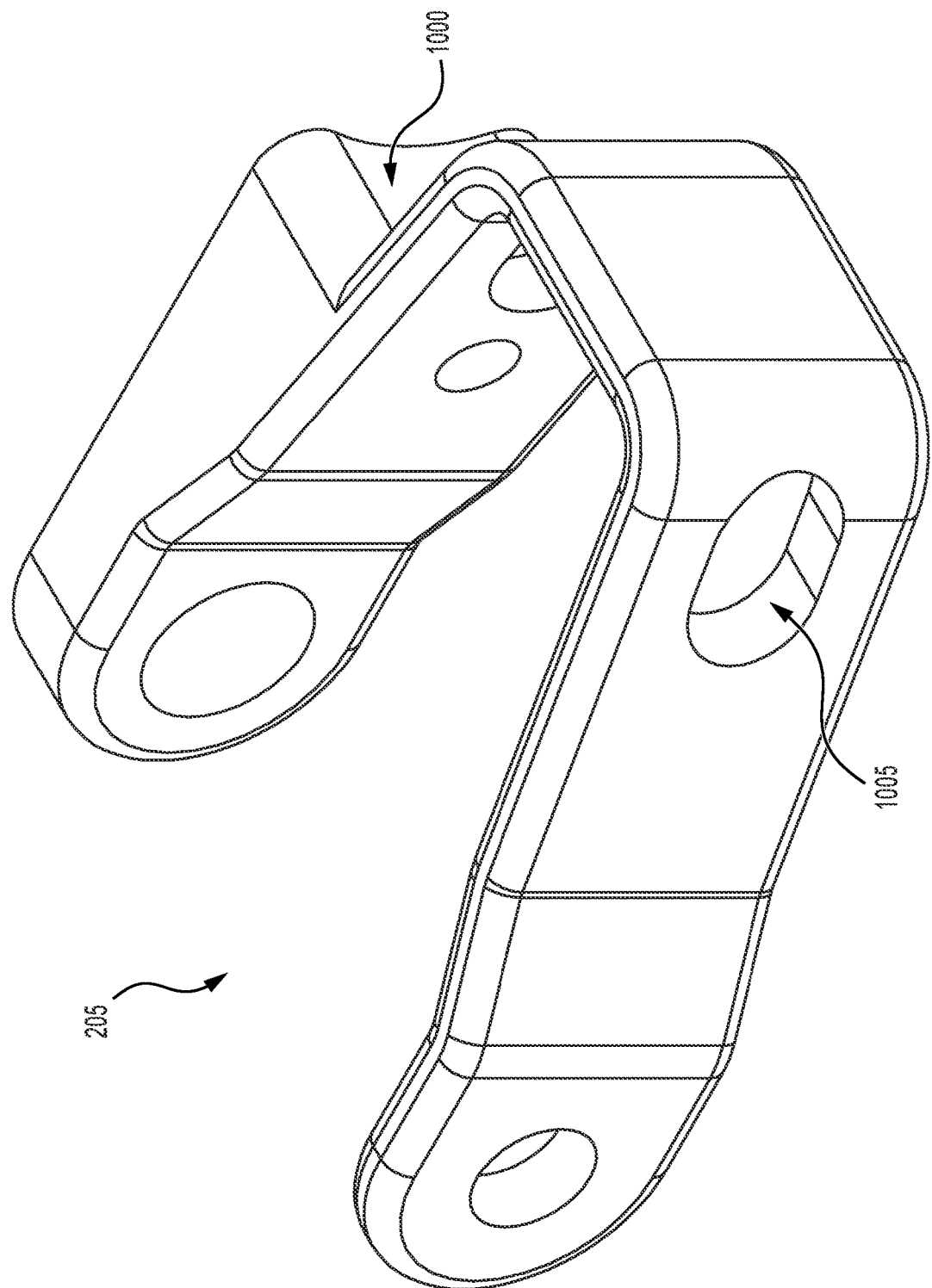
FIG. 10 is a schematic perspective view of the link portion of the assembly shown in FIG. 2.

FIG. 10 is a schematic perspective view of the link portion of the assembly shown in FIG. 2. As shown in FIG. 10, link 205 includes a concave portion 1000 configured to accommodate a connecting rod. In addition, FIG. 10 also illustrates a second leading rod opening 1005 discussed above. As shown, second leading rod opening 1005 may be ovalized/slotted to permit the belt to be a turn-curve belt.

Figure 11:
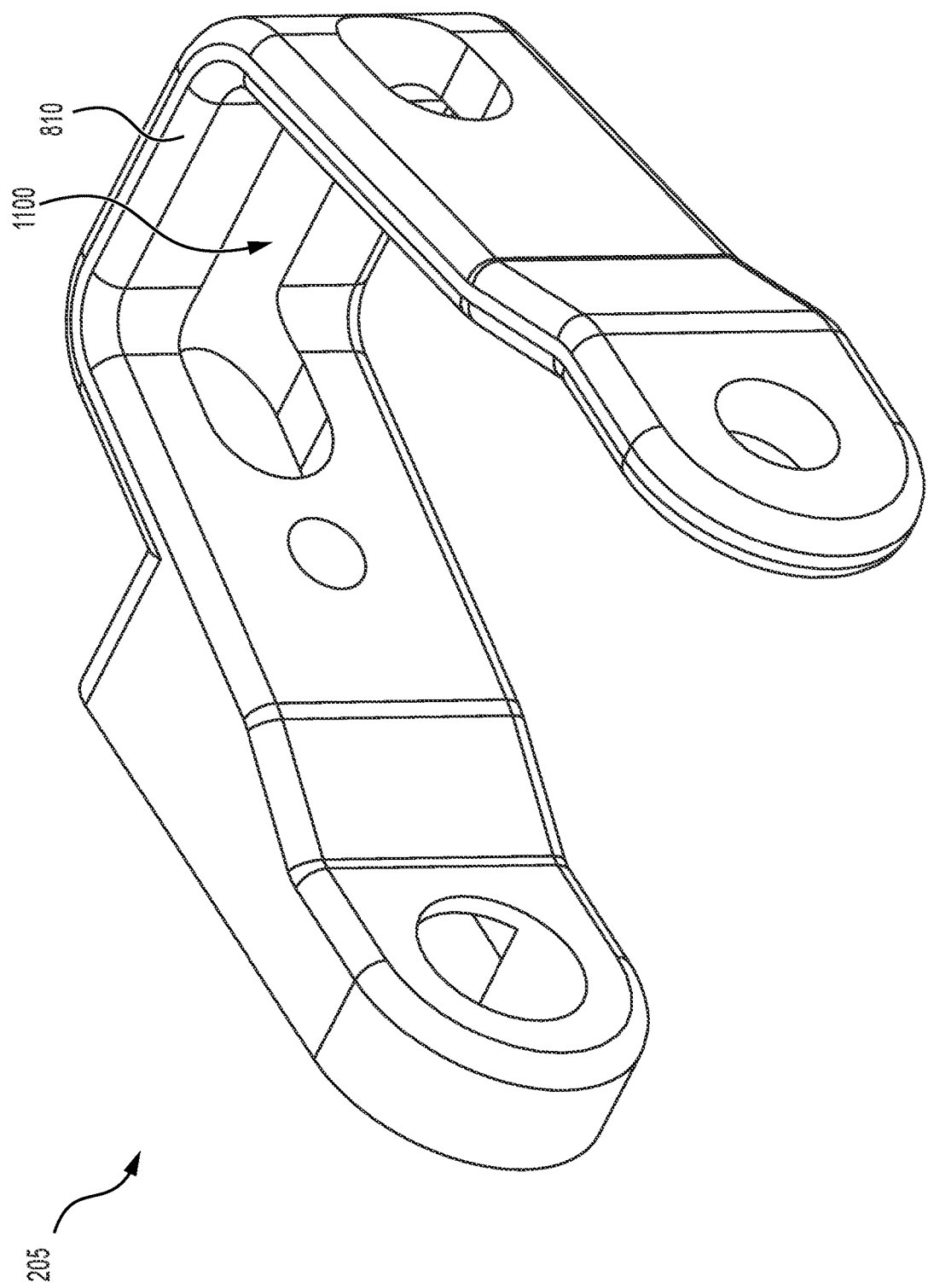
FIG. 11 is a second schematic view of the link.

FIG. 11 is a second schematic view of the link. As shown in FIG. 11, connecting portion 810 of link 205 includes a groove 1100 on the trailing side to accommodate a connecting rod. Groove 1100 provides stability to the assembly during belt movement.

Figure 12:
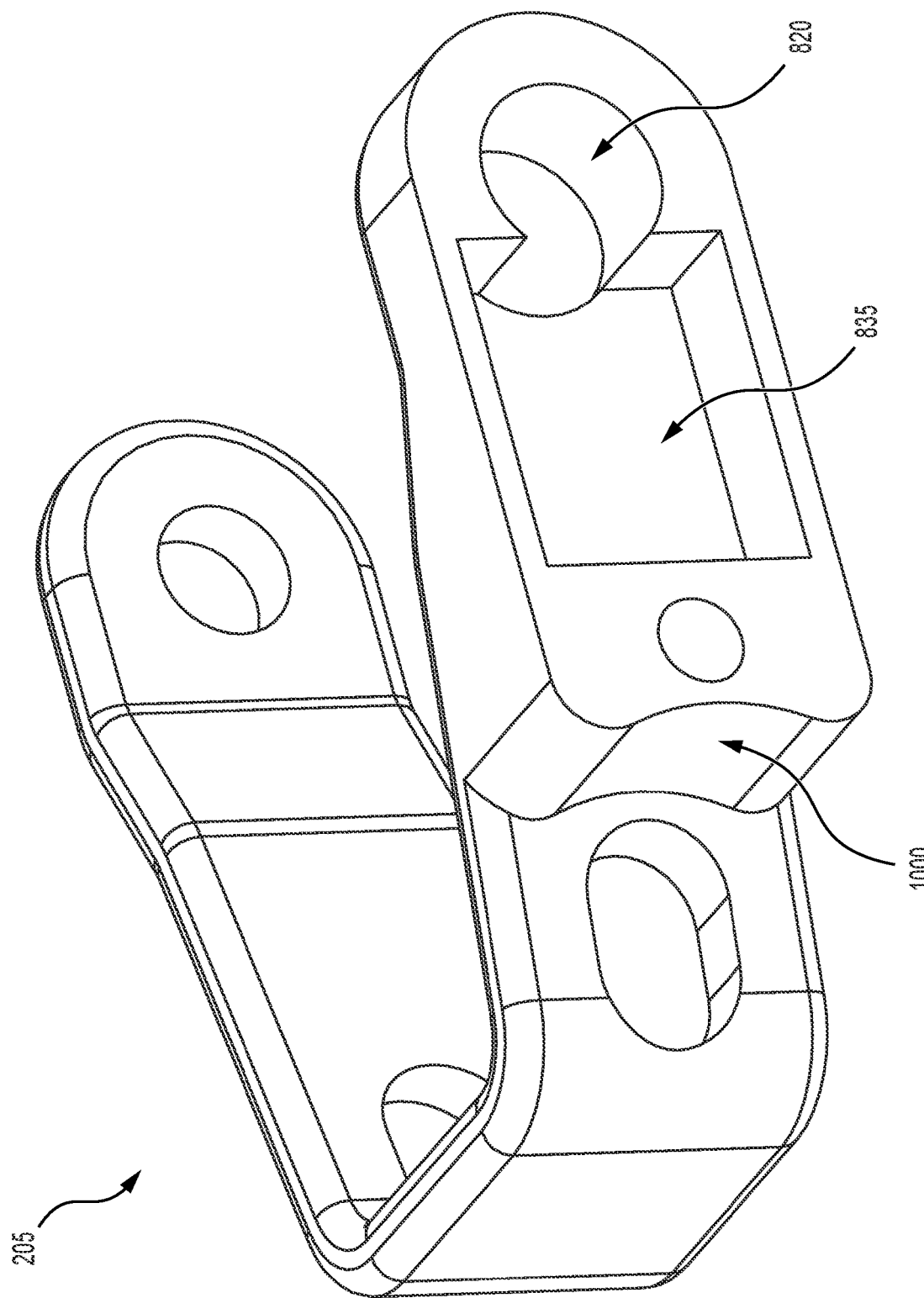
FIG. 12 is a third schematic view of the link.

FIG. 12 is a third schematic view of the link. FIG. 12 provides a better view of concave portion 1000, as well as first trailing rod opening 820 and receptacle 835. As shown in FIG. 12, at least a portion of first trailing rod opening 820 and receptacle 835 may intersect.

Figure 13:
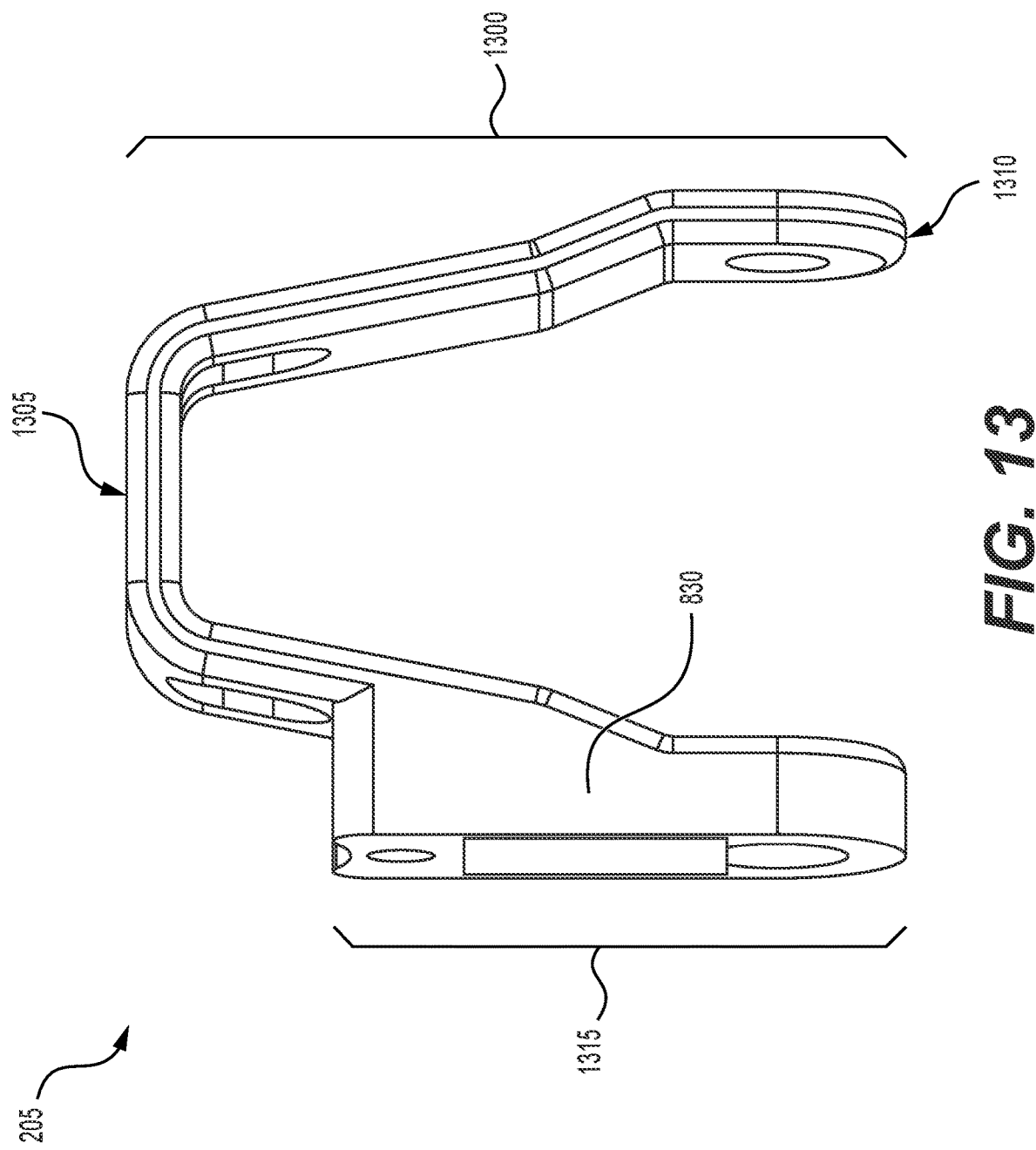
FIG. 13 is a fourth schematic view of the link.

FIG. 13 is a fourth schematic view of the link. Again, the U-shaped configuration of link 205 is illustrated. In addition, as shown in FIG. 13, the lateral extension may be shorter than the overall length of link 205. As shown, the overall length 1300 of link 205 extends between a leading end 1305 and a trailing end 1310 of link 205. A length 1315 of lateral extension 830 is considerably shorter than overall length 1300. Because of this arrangement, the leading connecting rod does not pass through the load cell. This provides a more stable strain measurement.

The load cell has a first end and a second end, in which the first end includes an opening through which a fastener may be inserted in order to attach the first end of the load cell to a body of the link, and the second end of the load cell has a second opening configured to receive a connecting rod of the belt.

Figure 14:
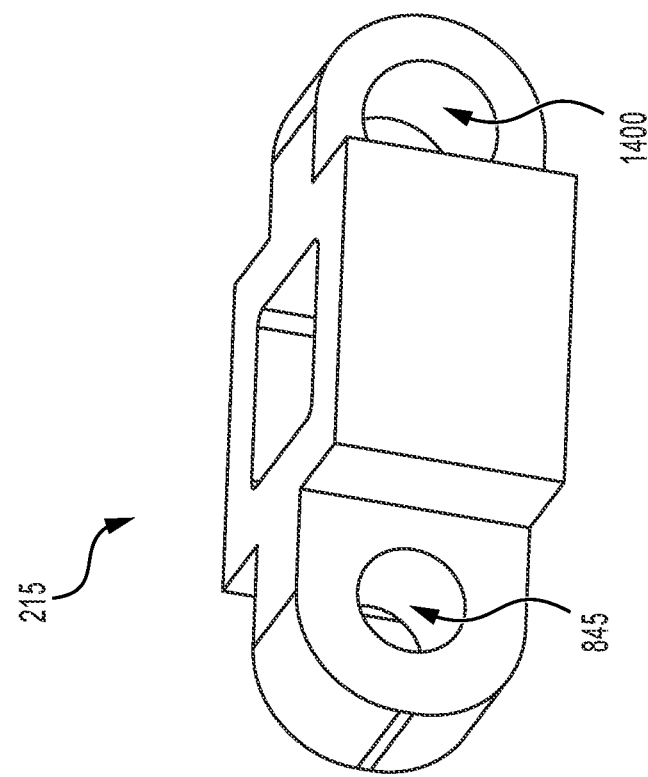
FIG. 14 is a schematic perspective view of a load cell from the sensor assembly shown in FIG. 2.

FIG. 14 is a schematic perspective view of a load cell from the sensor assembly shown in FIG. 2. Load cell 215 may include the fastener opening 845 discussed previously at a leading end of load cell 215, as well as a rod opening 1400 at a trailing end of load cell 215. (See also FIGS. 8-9.)

Figure 15:
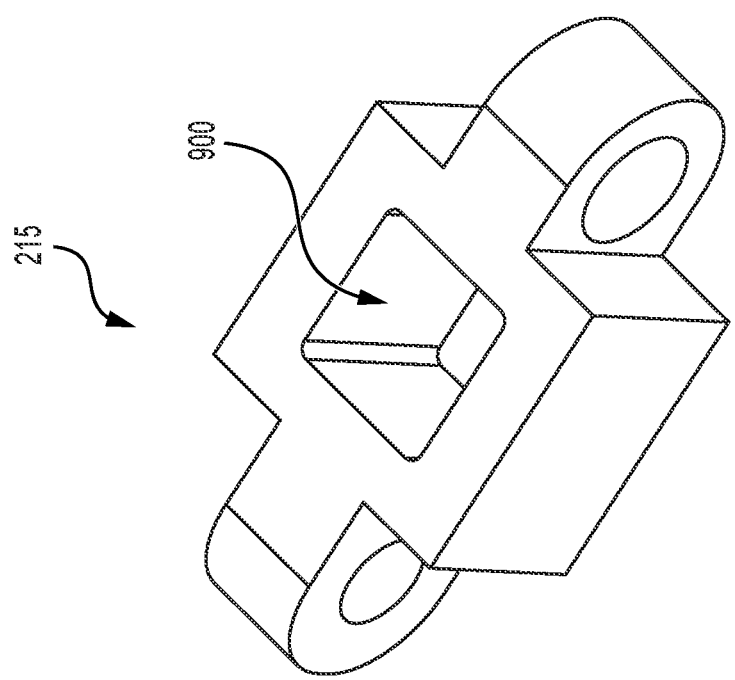
FIG. 15 is another schematic view of the load cell.

FIG. 15 is another schematic view of the load cell. FIG. 15 provides an improved view of thru-hole 900 through load cell 215.

Figure 16:
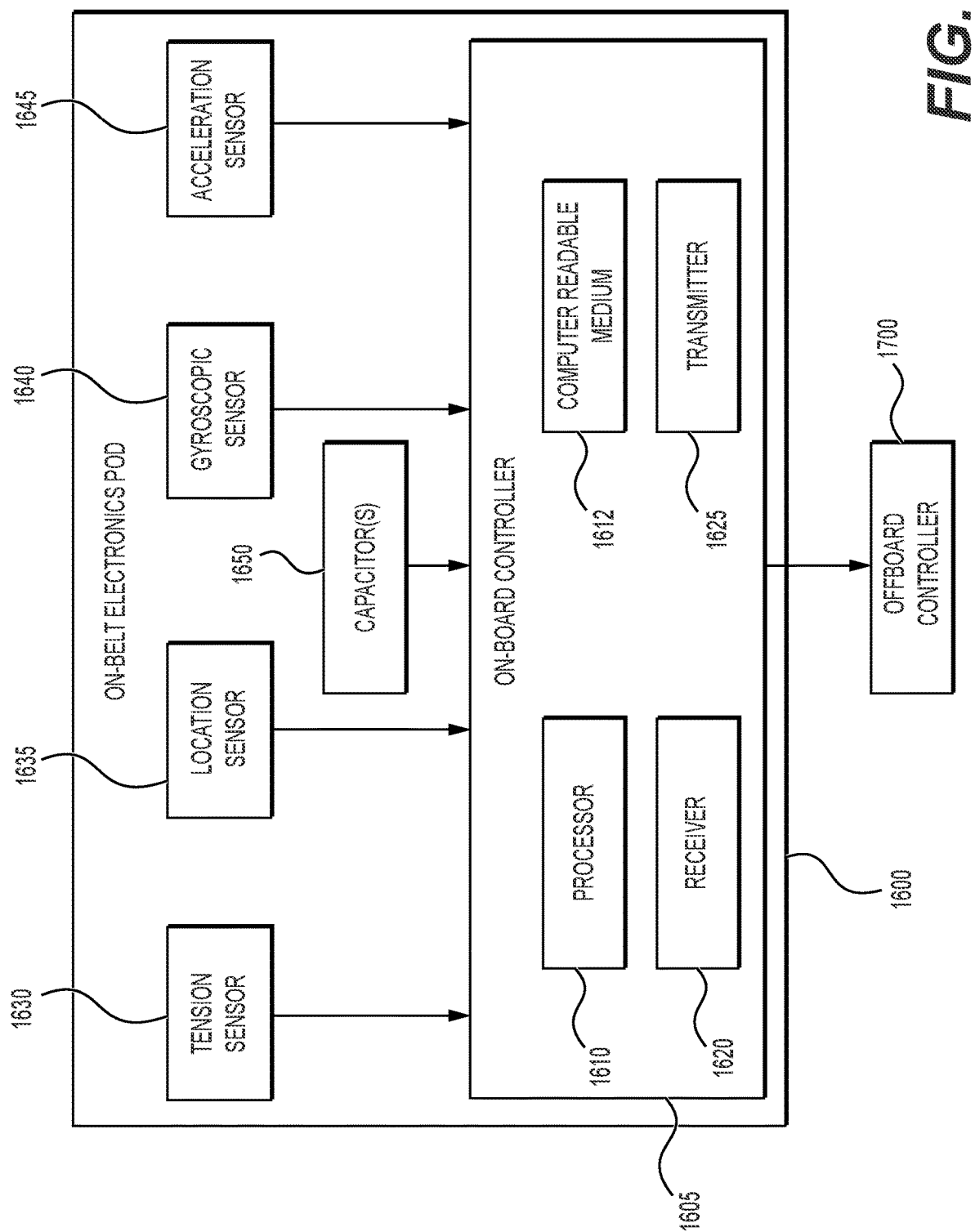
FIG. 16 is a block diagram illustrating onboard components of a data collection system according to an exemplary embodiment.

FIG. 16 is a block diagram illustrating onboard components of a data collection system according to an exemplary embodiment. As shown in FIG. 16, the system may include an on-belt electronics pod 1600. In some embodiments, pod 1600 may include tension sensor electronics 1630 related to the load cell. In other embodiments, the raw load cell data may simply be received by the electronics pod. In addition, pod 1600 may include a location sensor 1635 or electronic equipment configured to facilitate the location of the sensor assembly along the belt path. For example, in some embodiments, the system may utilize the belt speed and elapsed time (e.g., since the last time the sensor assembly passed a receiving module) to calculate how far along the belt path the sensor assembly is at a given time.

In addition, pod 1600 includes a gyroscopic sensor 1640 configured to detect belt angle in three axes. For example, if the sensor assembly is detected to be oriented at a non-horizontal angle about the longitudinal axis (the fore-aft axis extending along the direction of belt travel), this may indicate belt "flip-up" where a portion of the belt may be flipped upward from its proper horizontal position. Similarly, pod 1600 includes an acceleration sensor 1645 configured to detect belt acceleration along the same three axes. For example, detecting fluctuations in the acceleration of the belt along the longitudinal axis may indicate surging. Further, by detecting belt angle in three axes and belt acceleration along three axes, this provides six values which, collectively can be analyzed to determine many other aspects of belt operation.

Pod 1600 also includes one or more capacitors 1650. Capacitors 1650 may have any of the characteristics described above with respect to first capacitor 705 and second capacitor 710.

In addition, pod 1600 may include an onboard controller 1605. Controller 1605 may include various computing and communications hardware, such as servers, circuitry, displays, etc. Further, controller 1605 includes a device processor 1610 and a non-transitory computer readable medium 1615 including instructions executable by device processor 1610 to perform the processes discussed herein, such as receiving and transmitting data.

The onboard components are configured to operate at a relatively low voltage. This permits the system to continue to operate when the charge of the capacitors is low, thus maximizing the usage of the capacitors. In some embodiments, the onboard controller is configured to function with a power supply in the range of approximately 0.1 to approximately 5.5 volts. In some embodiments, the onboard controller is configured to function with a power supply of less than approximately 5.5 volts.

The non-transitory computer readable medium may include any suitable computer readable medium, such as a memory, e.g., RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, a read-only memory (ROM), a random access memory (RAM), a static random access memory (SRAM), a portable compact disc read-only memory (CD-ROM), an erasable programmable read-only memory (EPROM or Flash memory), a digital versatile disk (DVD), a memory stick, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

Controller 1605 may include networking hardware configured to interface with other nodes of a network, such as a LAN, WLAN, or other networks. In Further, controller 1605 may be configured to receive data from a plurality of sources and communicate information to one or more external destinations. Accordingly, controller 1605 may include a receiver 1620 and a transmitter 1625. (It will be appreciated that, in some embodiments, the receiver and transmitter may be combined in a transceiver.)

Any suitable communication platforms and/or protocols may be utilized for communication between controller 1605 and other components of the system. Since the various sources of information may each have their own platform and/or protocol, the system may be configured to interface with each platform and/or protocol to receive the data.

In some embodiments, computer readable medium 1615 of controller 1605 includes instructions, executable by processor 1610, to receive data from the one or more sensors and transmit the data to an offboard controller 1700.

Figure 17:
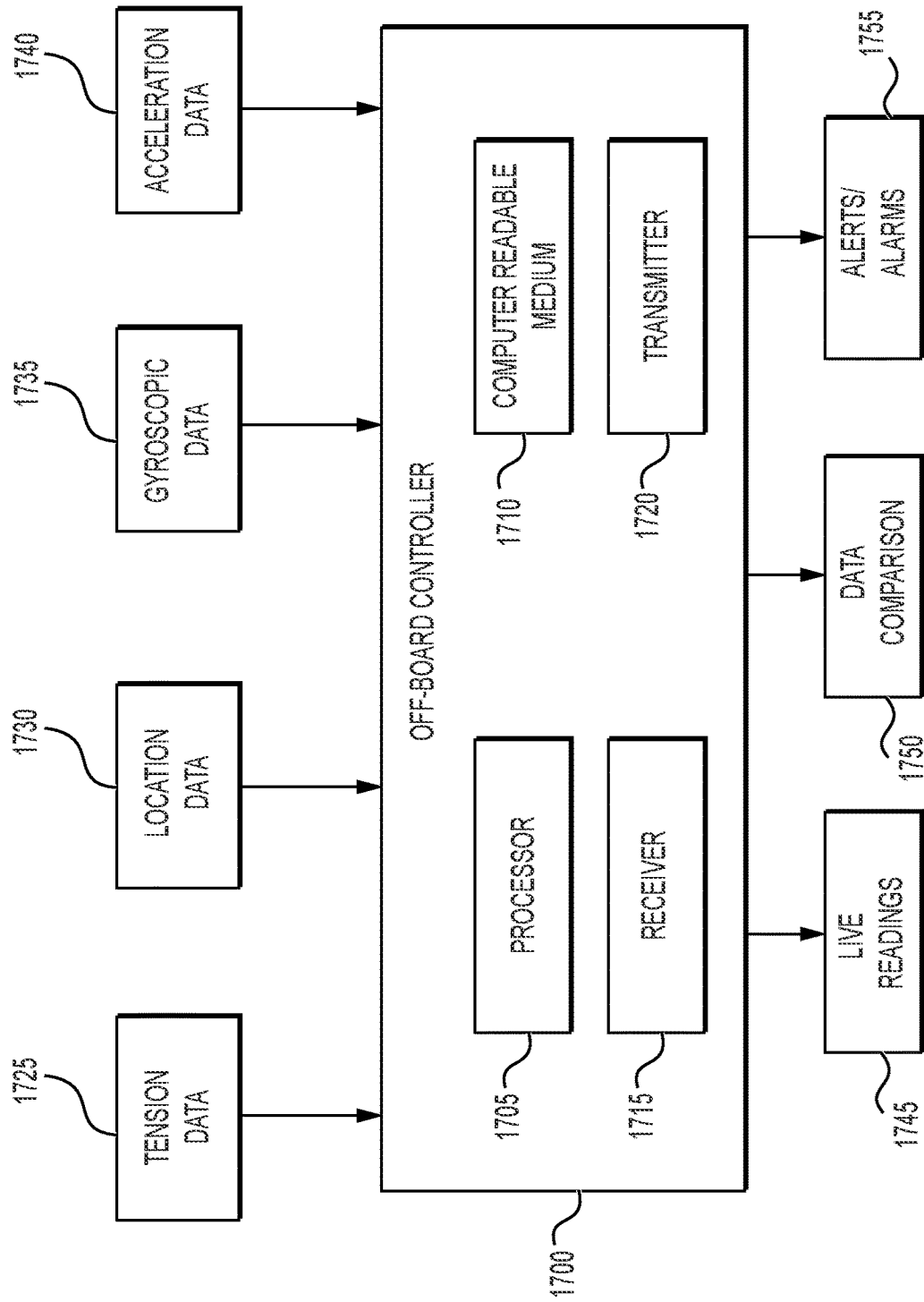
FIG. 17 is a block diagram illustrating offboard components of the data collection system.

FIG. 17 is a block diagram illustrating offboard components of the data collection system, i.e., components found in or otherwise associated with the receiving module. Similar to onboard controller 1605, offboard controller 1700 may include a device processor 1705, a non-transitory computer readable medium 1710, a receiver 1715, and a transmitter 1720. The features and characteristics of controller 1700 and its components may be similar to those discussed above with respect to onboard controller 1605.

It will be noted that the receiver module also includes equipment configured to inductively charge a power source onboard the belt as the belt passes by the receiver module. That is, the receiver module includes inductive charging equipment configured to inductively charge the capacitors in the electronics pod onboard the belt.

As shown in FIG. 17, offboard controller 1700 may be configured to receive tension data 1725, location data 1730, gyroscopic data 1735, and/or acceleration data 1740, all from onboard controller 1605. Offboard controller 1700 may collect this data and perform one or more processing steps. For example, in some cases, offboard controller may be configured to produce live readings 1745 of the collected data or parameters determined based on the data. Such live readings may be produced via a screen or graphical user interface for the customer and/or system manufacturer.

Alternatively, or additionally, offboard controller 1700 may be configured to perform one or more comparisons between data (1750). For example, current data can be compared to previously collected data to observe trends. Such trends may be indicative of wear or other malfunctions, enabling action to be taken before the malfunctioning belt reaches a catastrophic failure.

Alternatively, or additionally, offboard controller 1700 may be configured to activate one or more alerts or alarms (1755) if a measured parameter falls outside of a predetermined range. For example, if the belt tension is detected to be above a predetermined threshold, an alert may be generated so that the system can be checked. Similarly, if the belt angle and/or belt acceleration falls outside of a predetermined range, an alert may be generated.

Because the operational data is collected alongside location data, the thresholds may be dynamic instead of static.

For example, because of the nature of a spiral system, the tension on the belt typically increases as the belt ascends the spiral. Therefore, the threshold may be dynamic, where a lower tension is needed to trigger an alert near the bottom of the spiral, and a higher tension is needed near the top of the spiral to generate an alert. For similar reasons, the range of acceptable belt acceleration may also be dynamic, since the belt is expected to accelerate in different amounts and in different directions at different portions of the belt path. In addition, with respect to belt angle, since the belt not only travels horizontally, but also vertically and along a slope (within the spiral), and in some cases even with a banking (e.g., around corners), the expected angle of the belt varies around the belt path. Therefore, when considering the acceptability of a measured belt angle, a dynamic expectation of what the angle should be is used.

Further, by collecting data about the belt path, and documenting the location at which each piece of data is recorded, a system "fingerprint" may be produced at any given time. In some cases, the overall fingerprint may be compared to a previously recorded fingerprint.

Figure 18:
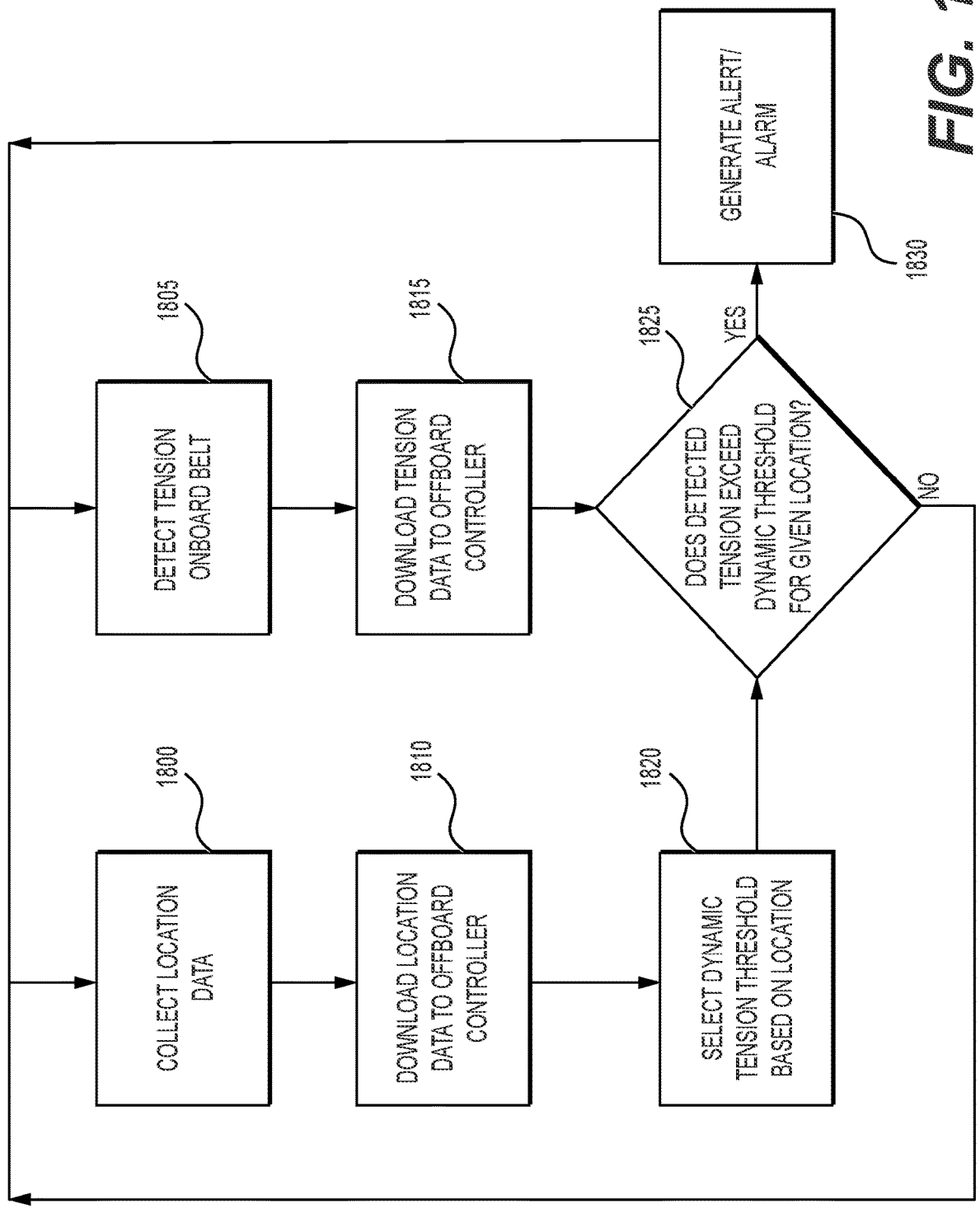
FIG. 18 is a flowchart illustrating a method of monitoring belt tension.

FIG. 18 is a flowchart illustrating a method of monitoring belt tension. It will be understood that the order of operations discussed may vary slightly. As shown in FIG. 18, location data is collected at step 1800 while belt tension is detected at step 1805. The location data is downloaded/transmitted to the offboard controller at step 1810 and the measured tension is downloaded/transmitted to the offboard controller at step 1815. In some embodiments, the tension data may be buffered prior to transmitting offboard. This reduces the amount of memory required for the overall collection of data. This reduces the required size of the electronics pod, which is beneficial for packaging. For similar reasons, the system may also be configured to buffer other types of data before transmitting.

At step 1820, a dynamic tension threshold is selected, and at step 1825, an evaluation is made as to whether the measured tension exceeds the threshold at the corresponding location based on the location data collected. If yes, an alarm is generated at step 1830, and the system continues to monitor the tension of the belt. If not, then the system merely continues to monitor the operation of the belt.

Figure 19:
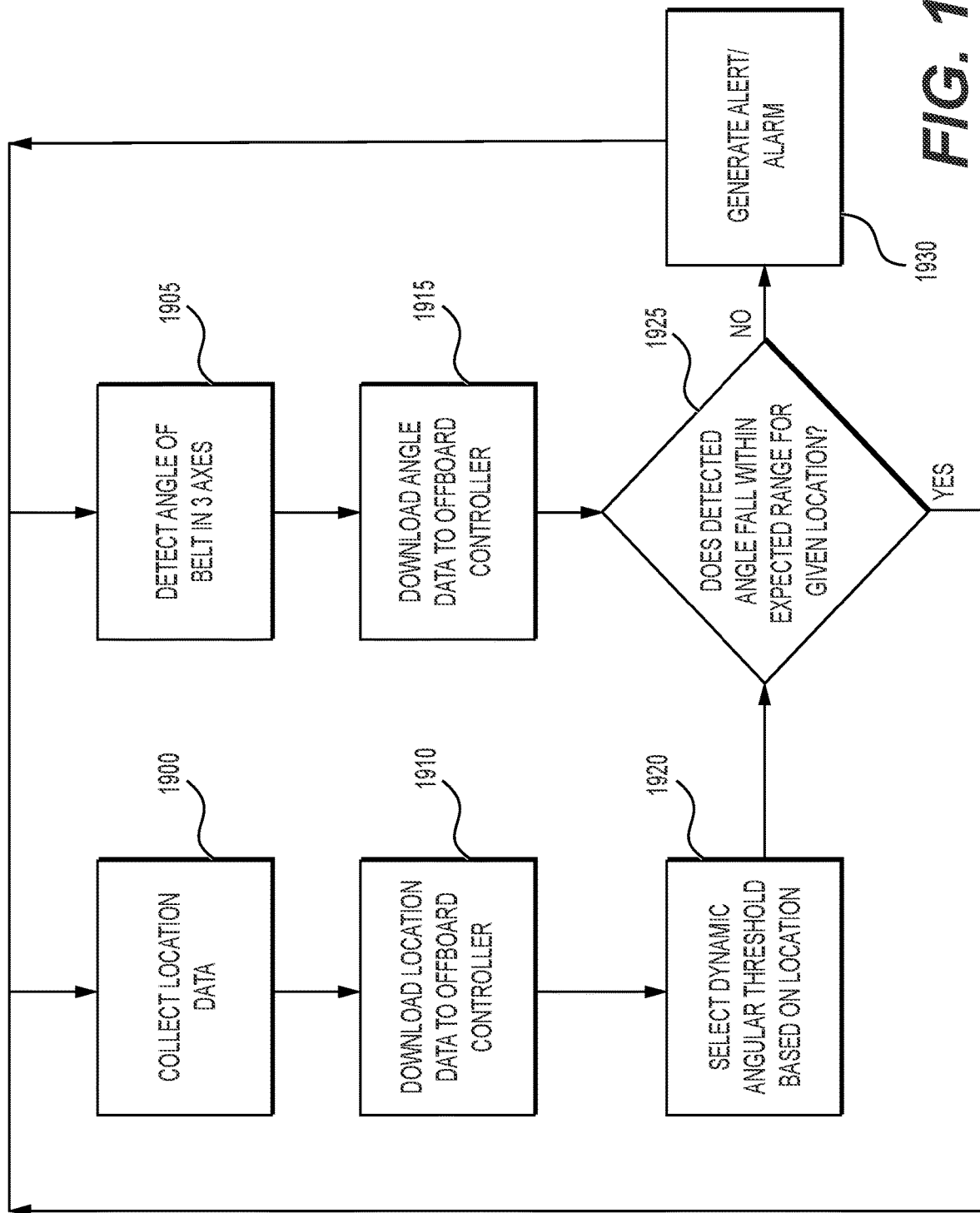
FIG. 19 is a flowchart illustrating a method of monitoring belt angle.

FIG. 19 is a flowchart illustrating a method of monitoring belt angle. Similar to FIG. 18 above, location data is collected at step 1900 while belt angle is detected at step 1905. Then, the location data is downloaded/transmitted offboard at step 1910 and the angle data is downloaded/transmitted offboard at step 1915. Dynamic angular thresholds (i.e., an acceptable range of angular values) are determined at step 1920 based on the location data, and an evaluation is made at step 1925 as to whether the detected angle falls within an acceptable range. It will be understood that this evaluation is made in all three axes. If the belt angle falls outside of the expected range in any of the three axes, an alert is generated at step 1930.

Figure 20:
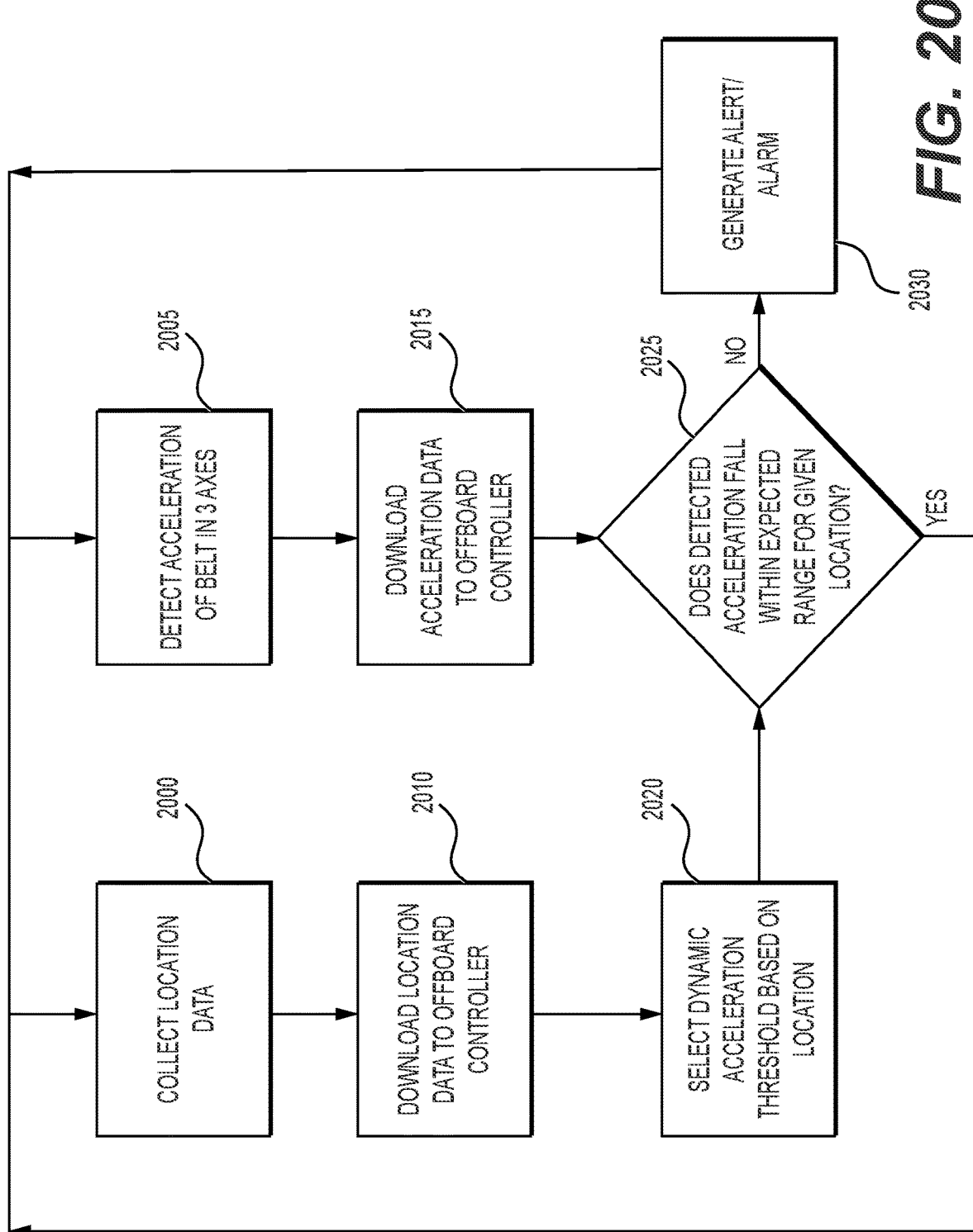
FIG. 20 is a flowchart illustrating a method of monitoring belt acceleration.

FIG. 20 is a flowchart illustrating a method of monitoring belt acceleration. Location data is collected at step 2000 while belt acceleration is detected at step 2005. Then, the location data is downloaded/transmitted offboard at step 2010 and the acceleration data is downloaded/transmitted offboard at step 2015. Dynamic acceleration thresholds (i.e., an acceptable range of acceleration values) are determined at step 2020 based on the location data, and an evaluation is made at step 2025 as to whether the detected acceleration falls within an acceptable range. It will be understood that this evaluation is made in all three axes. If the belt acceleration falls outside of the expected range along any of the three axes, an alert is generated at step 2030.

The embodiments discussed herein may make use of methods and systems in artificial intelligence to improve efficiency and effectiveness of the disclosed systems. As used herein, "artificial intelligence" may include any known methods in machine learning and related fields. As examples, artificial intelligence may include systems and methods used in deep learning and machine vision.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

We claim:

1. A sensor assembly for a conveyor belt, comprising:
   one or more sensors configured to be integrated with the belt and collect data regarding belt operating conditions; and
   an onboard controller including a device processor and a non-transient computer readable medium having stored thereon instructions, executable by the processor, to perform the following functions:
   receiving data from the one or more sensors; and
   transmitting the data to an offboard controller;
   wherein the data regarding belt operating conditions includes belt angle data.

2. The sensor assembly of claim 1, wherein the data regarding belt operating conditions further includes belt tension data.

3. The sensor assembly of claim 1, wherein the computer readable medium further includes instructions to buffer the data regarding belt operating conditions prior to transmitting the tension data to the offboard controller.

4. The sensor assembly of claim 1, wherein the onboard controller is configured to function with a power supply of less than approximately 5.5 volts.

5. The sensor assembly of claim 1, wherein the data regarding belt operating conditions includes belt angle data about three different axes.

6. The sensor assembly of claim 1, wherein the angle data includes gyroscopic data.

7. A sensor assembly for a conveyor belt, comprising:
   one or more sensors configured to be integrated with the belt and collect data regarding belt operating conditions; and
   an onboard controller including a device processor and a non-transient computer readable medium having stored thereon instructions, executable by the processor, to perform the following functions:
   receiving data from the one or more sensors; and
   transmitting the data to an offboard controller;
   wherein the data regarding belt operating conditions includes belt acceleration data.

8. The sensor assembly of claim 7, wherein the data regarding belt operating conditions includes belt acceleration data along three different axes.

9. The sensor assembly of claim 7, wherein the onboard controller is configured to function with a power supply of less than approximately 5.5 volts.

10. The sensor assembly of claim 9, wherein the onboard controller is configured to function with a power supply in the range of approximately 0.1 to approximately 5.5 volts.

11. A receiver module for a conveyor belt data collection system, comprising:
- a housing located offboard from the belt and configured to be positioned proximate to a conveyor belt;
- a belt interface unit including an offboard controller including a device processor and a non-transient computer readable medium having stored thereon instructions, executable by the processor, to perform the following functions:
- receiving data regarding belt operating conditions transmitted by an onboard controller integrated with the belt;
- wherein the data regarding belt operating conditions includes belt tension data;
- wherein the computer readable medium further includes instructions to activate an alert if the tension data exceeds a predetermined threshold; and
- wherein the predetermined threshold is a dynamic threshold that varies depending on a location at which the tension data was collected along a path of the conveyor belt.

12. The receiver module of claim 11, further including equipment configured to inductively charge a power source onboard the belt as the belt passes by the receiver module.

13. The receiver module of claim 11, wherein the data regarding belt operating conditions further includes belt angle data.

14. The receiver module of claim 13, wherein the data regarding belt operating conditions includes belt angle data about three different axes.

15. The receiver module of claim 13, wherein the computer readable medium further includes instructions to activate an alert if the belt angle data falls outside a predetermined range; and
wherein the predetermined range is a dynamic range that varies depending on a location at which the belt angle data was collected along a path of the conveyor belt.

16. The receiver module of claim 13, wherein the angle data includes gyroscopic data.

17. The receiver module of claim 11, wherein the data regarding belt operating conditions further includes belt acceleration data.

18. The receiver module of claim 17, wherein the data regarding belt operating conditions includes belt acceleration data along three different axes.

19. The receiver module of claim 17, wherein the computer readable medium further includes instructions to activate an alert if the belt acceleration data falls outside a predetermined range; and
wherein the predetermined range is a dynamic range that varies depending on a location at which the belt acceleration data was collected along a path of the conveyor belt.

20. A conveyor belt operation monitoring system, comprising:
- one or more sensors configured to be integrated with the belt and collect data regarding belt operating conditions; and
- an onboard controller including a first device processor and a first non-transient computer readable medium having stored thereon instructions, executable by the processor, to perform the following functions:
- receiving data from the one or more sensors; and
- transmitting the data to an offboard controller; and
- at least one receiving module including a belt interface unit, the belt interface unit including an offboard controller including a second device processor and a second non-transient computer readable medium having stored thereon instructions, executable by the processor, to perform the following functions:
- receiving the data transmitted by the onboard controller;
- wherein the data regarding belt operating conditions includes belt tension data;
- wherein the computer readable medium further includes instructions to activate an alert if the tension data exceeds a predetermined threshold; and
- wherein the predetermined threshold is a dynamic threshold that varies depending on a location at which the tension data was collected along a path of the conveyor belt.

21. The system of claim 20, wherein more than one receiving module is provided about the path of the belt.

22. The system of claim 21, wherein the system includes a mesh network of receiving modules.

23. The system of claim 20, wherein the onboard controller is configured to function with a power supply of less than approximately 5.5 volts.

24. The system of claim 23, wherein the onboard controller is configured to function with a power supply in the range of approximately 0.1 to approximately 5.5 volts.

* * * * *